US012754425B2

(12) United States Patent
Kimmel et al.

(10) Patent No.: US 12,754,425 B2
(45) Date of Patent: *Oct. 6, 2026

(54) POLYCHROMATIC LIGHT OUT-COUPLING APPARATUS, NEAR-EYE DISPLAYS COMPRISING THE SAME, AND METHOD OF OUT-COUPLING POLYCHROMATIC LIGHT

(71) Applicant: Magic Leap, Inc., Plantation, FL (US)

(72) Inventors: Jyrki Kimmel, Tampere (FI); Toni Jarvenpaa, Akaa (FI); Peter Eskolin, Tampere (FI); Marja Salmimaa, Tampere (FI)

(73) Assignee: Magic Leap, Inc., Plantation, FL (US)

( * ) Notice: Subject to any disclaimer, the term of this patent is extended or adjusted under 35 U.S.C. 154(b) by 314 days.

This patent is subject to a terminal disclaimer.

(21) Appl. No.: 18/517,915

(22) Filed: Nov. 22, 2023

(65) Prior Publication Data

US 2024/0085708 A1 Mar. 14, 2024

Related U.S. Application Data

(63) Continuation of application No. 17/516,483, filed on Nov. 1, 2021, now Pat. No. 11,874,468, which is a (Continued)

(30) Foreign Application Priority Data

Dec. 30, 2016 (EP) .................................... 16207441

(51) Int. Cl.

*G02B 27/01* (2006.01)
*G02B 5/18* (2006.01)
*G02B 27/00* (2006.01)

(52) U.S. Cl.

CPC ....... *G02B 27/0172* (2013.01); *G02B 5/1842* (2013.01); *G02B 5/1866* (2013.01);
(Continued)

(58) Field of Classification Search

CPC ............ G02B 27/0172; G02B 27/0081; G02B 5/1842; G02B 5/1866; G02B 2027/0112;
(Continued)

(56) References Cited

U.S. PATENT DOCUMENTS 4,344,092 A 8/1982 Miller
4,652,930 A 3/1987 Crawford
(Continued)

FOREIGN PATENT DOCUMENTS

CN 100416340 C 9/2008
CN 101449270 A 6/2009
(Continued)

OTHER PUBLICATIONS

"Non Final Office Action mailed on Jun. 26, 2025", U.S. Appl. No. 18/348,732, (17 pages).
(Continued)

*Primary Examiner* — William R Alexander
(74) *Attorney, Agent, or Firm* — Stephen M. De Klerk

(57) ABSTRACT

The present invention provides an apparatus (3) comprising a first out-coupling diffractive optical element (10) and a second out-coupling diffractive optical element (20). Each of the first and second out-coupling diffractive optical elements comprises a first region (12*a*, 22*a*) having a first repeated diffraction spacing, $d_1$, and a second region (12*b*, 22*b*) adjacent to the first region having a second repeated diffraction spacing, $d_2$, different from the first spacing, $d_1$. The first region (12*a*) of the first out-coupling diffractive optical element (10) is superposed on and aligned with the second region (22*b*) of the second out-coupling diffractive
(Continued)

optical element (20). The second region (12*b*) of the first out-coupling diffractive optical element (10) is superposed on and aligned with the first region (22*a*) of the second out-coupling diffractive optical element (20).

19 Claims, 9 Drawing Sheets

Related U.S. Application Data continuation of application No. 16/698,588, filed on Nov. 27, 2019, now Pat. No. 11,199,713, which is a continuation of application No. 15/843,258, filed on Dec. 15, 2017, now Pat. No. 10,527,853.

(52) U.S. Cl.
CPC .. *G02B 27/0081* (2013.01); *G02B 2027/0112* (2013.01); *G02B 2027/0116* (2013.01); *G02B 2027/0123* (2013.01); *G02B 2027/0125* (2013.01); *G02B 2027/0132* (2013.01)

(58) Field of Classification Search
CPC .... G02B 2027/0116; G02B 2027/0123; G02B 2027/0125; G02B 2027/0132
USPC .......................................................... 359/567
See application file for complete search history.

(56) References Cited

U.S. PATENT DOCUMENTS

| | | | |
|---|---|---|---|
| 4,810,080 | A | 3/1989 | Grendol et al. |
| 4,997,268 | A | 3/1991 | Dauvergne |
| 5,007,727 | A | 4/1991 | Kahaney et al. |
| 5,074,295 | A | 12/1991 | Willis |
| 5,240,220 | A | 8/1993 | Elberbaum |
| 5,251,635 | A | 10/1993 | Dumoulin et al. |
| 5,410,763 | A | 5/1995 | Bolle |
| 5,455,625 | A | 10/1995 | Englander |
| 5,495,286 | A | 2/1996 | Adair |
| 5,497,463 | A | 3/1996 | Stein et al. |
| 5,659,701 | A | 8/1997 | Amit et al. |
| 5,682,255 | A | 10/1997 | Friesem et al. |
| 5,689,669 | A | 11/1997 | Lynch |
| 5,826,092 | A | 10/1998 | Flannery |
| 5,854,872 | A | 12/1998 | Tai |
| 5,864,365 | A | 1/1999 | Sramek et al. |
| 5,937,202 | A | 8/1999 | Crosetto |
| 6,002,853 | A | 12/1999 | de Hond |
| 6,012,811 | A | 1/2000 | Chao et al. |
| 6,016,160 | A | 1/2000 | Coombs et al. |
| 6,064,749 | A | 5/2000 | Hirota et al. |
| 6,076,927 | A | 6/2000 | Owens |
| 6,079,982 | A | 6/2000 | Meader |
| 6,117,923 | A | 9/2000 | Amagai et al. |
| 6,119,147 | A | 9/2000 | Toomey et al. |
| 6,124,977 | A | 9/2000 | Takahashi |
| 6,179,619 | B1 | 1/2001 | Tanaka |
| 6,191,809 | B1 | 2/2001 | Hori et al. |
| 6,219,045 | B1 | 4/2001 | Leahy et al. |
| 6,243,091 | B1 | 6/2001 | Berstis |
| 6,271,843 | B1 | 8/2001 | Lection et al. |
| 6,362,817 | B1 | 3/2002 | Powers et al. |
| 6,375,369 | B1 | 4/2002 | Schneider et al. |
| 6,385,735 | B1 | 5/2002 | Wilson |
| 6,396,522 | B1 | 5/2002 | Vu |
| 6,414,679 | B1 | 7/2002 | Miodonski et al. |
| 6,538,655 | B1 | 3/2003 | Kubota |
| 6,541,736 | B1 | 4/2003 | Huang et al. |
| 6,570,563 | B1 | 5/2003 | Honda |
| 6,573,903 | B2 | 6/2003 | Gantt |
| 6,590,593 | B1 | 7/2003 | Robertson et al. |
| 6,621,508 | B1 | 9/2003 | Shiraishi et al. |
| 6,690,393 | B2 | 2/2004 | Heron et al. |
| 6,757,068 | B2 | 6/2004 | Foxlin |
| 6,784,901 | B1 | 8/2004 | Harvfey et al. |
| 6,961,055 | B2 | 11/2005 | Doak |
| 7,046,515 | B1 | 5/2006 | Wyatt |
| 7,051,219 | B2 | 5/2006 | Hwang |
| 7,076,674 | B2 | 7/2006 | Cervantes |
| 7,111,290 | B1 | 9/2006 | Yates, Jr. |
| 7,119,819 | B1 | 10/2006 | Robertson et al. |
| 7,211,986 | B1 | 5/2007 | Flowerdew et al. |
| 7,219,245 | B1 | 5/2007 | Raghuvanshi |
| 7,382,288 | B1 | 6/2008 | Wilson |
| 7,414,629 | B2 | 8/2008 | Santodomingo |
| 7,431,453 | B2 | 10/2008 | Hogan |
| 7,467,356 | B2 | 12/2008 | Gettman et al. |
| 7,542,040 | B2 | 6/2009 | Templeman |
| 7,573,640 | B2 | 8/2009 | Nivon et al. |
| 7,653,877 | B2 | 1/2010 | Matsuda |
| 7,663,625 | B2 | 2/2010 | Chartier et al. |
| 7,724,980 | B1 | 5/2010 | Shenzhi |
| 7,746,343 | B1 | 6/2010 | Charaniya et al. |
| 7,751,662 | B2 | 7/2010 | Kleemann |
| 7,758,185 | B2 | 7/2010 | Lewis |
| 7,788,323 | B2 | 8/2010 | Greenstein et al. |
| 7,804,507 | B2 | 9/2010 | Yang et al. |
| 7,814,429 | B2 | 10/2010 | Buffet et al. |
| 7,817,150 | B2 | 10/2010 | Reichard et al. |
| 7,844,724 | B2 | 11/2010 | Van Wie et al. |
| 8,060,759 | B1 | 11/2011 | Arnan et al. |
| 8,120,851 | B2 | 2/2012 | Iwasa |
| 8,214,660 | B2 | 7/2012 | Capps, Jr. |
| 8,246,408 | B2 | 8/2012 | Elliot |
| 8,353,594 | B2 | 1/2013 | Lewis |
| 8,360,578 | B2 | 1/2013 | Nummela et al. |
| 8,508,676 | B2 | 8/2013 | Silverstein et al. |
| 8,547,638 | B2 | 10/2013 | Levola |
| 8,605,764 | B1 | 12/2013 | Rothaar et al. |
| 8,619,365 | B2 | 12/2013 | Harris et al. |
| 8,696,113 | B2 | 4/2014 | Lewis |
| 8,698,701 | B2 | 4/2014 | Margulis |
| 8,733,927 | B1 | 5/2014 | Lewis |
| 8,736,636 | B2 | 5/2014 | Kang |
| 8,759,929 | B2 | 6/2014 | Shiozawa et al. |
| 8,793,770 | B2 | 7/2014 | Lim |
| 8,823,855 | B2 | 9/2014 | Hwang |
| 8,847,988 | B2 | 9/2014 | Geisner et al. |
| 8,874,673 | B2 | 10/2014 | Kim |
| 9,010,929 | B2 | 4/2015 | Lewis |
| 9,015,501 | B2 | 4/2015 | Gee |
| 9,086,537 | B2 | 7/2015 | Iwasa et al. |
| 9,095,437 | B2 | 8/2015 | Boyden et al. |
| 9,239,473 | B2 | 1/2016 | Lewis |
| 9,244,293 | B2 | 1/2016 | Lewis |
| 9,244,533 | B2 | 1/2016 | Friend et al. |
| 9,285,872 | B1 | 3/2016 | Raffle et al. |
| 9,383,823 | B2 | 7/2016 | Geisner et al. |
| 9,489,027 | B1 | 11/2016 | Ogletree |
| 9,519,305 | B2 | 12/2016 | Wolfe |
| 9,581,820 | B2 | 2/2017 | Robbins |
| 9,582,060 | B2 | 2/2017 | Balatsos |
| 9,658,473 | B2 | 5/2017 | Lewis |
| 9,671,566 | B2 | 6/2017 | Abovitz et al. |
| 9,671,615 | B1 | 6/2017 | Vallius et al. |
| 9,696,795 | B2 | 7/2017 | Marcolina et al. |
| 9,798,144 | B2 | 10/2017 | Sako et al. |
| 9,874,664 | B2 | 1/2018 | Stevens et al. |
| 9,880,441 | B1 | 1/2018 | Osterhout |
| 9,918,058 | B2 | 3/2018 | Takahasi et al. |
| 9,955,862 | B2 | 5/2018 | Freeman et al. |
| 9,978,118 | B1 | 5/2018 | Ozgumer et al. |
| 9,996,797 | B1 | 6/2018 | Holz et al. |
| 10,018,844 | B2 | 7/2018 | Levola et al. |
| 10,082,865 | B1 | 9/2018 | Raynal et al. |
| 10,151,937 | B2 | 12/2018 | Lewis |
| 10,185,147 | B2 | 1/2019 | Lewis |
| 10,218,679 | B1 | 2/2019 | Jawahar |
| 10,241,545 | B1 | 3/2019 | Richards et al. |
| 10,317,680 | B1 | 6/2019 | Richards et al. |
| 10,436,594 | B2 | 10/2019 | Belt et al. |
| 10,516,853 | B1 | 12/2019 | Gibson et al. |

(56) References Cited

U.S. PATENT DOCUMENTS 10,527,853 B2* 1/2020 Kimmel ............... G02B 5/1842
10,551,879 B1 2/2020 Richards et al.
10,578,870 B2 3/2020 Kimmel
10,646,283 B2 5/2020 Johnson et al.
10,698,202 B2 6/2020 Kimmel et al.
10,825,424 B2 11/2020 Zhang
10,856,107 B2 12/2020 Mycek et al.
10,987,176 B2 4/2021 Poltaretskyi et al.
11,190,681 B1 11/2021 Brook et al.
11,199,713 B2* 12/2021 Kimmel ............... G02B 5/1866
11,209,656 B1 12/2021 Choi et al.
11,236,993 B1 2/2022 Hall et al.
11,262,585 B2 3/2022 Potnis et al.
11,874,468 B2* 1/2024 Kimmel ............. G02B 27/0081
11,900,626 B2 2/2024 Tang
2001/0010598 A1 8/2001 Aritake et al.
2001/0018667 A1 8/2001 Kim
2002/0007463 A1 1/2002 Fung
2002/0063913 A1 5/2002 Nakamura et al.
2002/0071050 A1 6/2002 Homberg
2002/0095463 A1 7/2002 Matsuda
2002/0108064 A1 8/2002 Nunally
2002/0113820 A1 8/2002 Robinson et al.
2002/0122648 A1 9/2002 Mule' et al.
2002/0140848 A1 10/2002 Cooper et al.
2003/0028816 A1 2/2003 Bacon
2003/0048456 A1 3/2003 Hill
2003/0067685 A1 4/2003 Niv
2003/0077458 A1 4/2003 Korenaga et al.
2003/0080976 A1 5/2003 Satoh et al.
2003/0115494 A1 6/2003 Cervantes
2003/0218614 A1 11/2003 Lavelle et al.
2003/0219992 A1 11/2003 Schaper
2003/0226047 A1 12/2003 Park
2004/0001533 A1 1/2004 Tran et al.
2004/0021600 A1 2/2004 Wittenberg
2004/0025069 A1 2/2004 Gary et al.
2004/0042377 A1 3/2004 Nikoloai et al.
2004/0073822 A1 4/2004 Greco
2004/0073825 A1 4/2004 Itoh
2004/0111248 A1 6/2004 Granny et al.
2004/0113887 A1 6/2004 Pair et al.
2004/0174496 A1 9/2004 Ji et al.
2004/0186902 A1 9/2004 Stewart
2004/0193441 A1 9/2004 Altieri
2004/0201857 A1 10/2004 Foxlin
2004/0238732 A1 12/2004 State et al.
2004/0240072 A1 12/2004 Schindler et al.
2004/0246391 A1 12/2004 Travis
2004/0268159 A1 12/2004 Aasheim et al.
2005/0001977 A1 1/2005 Zelman
2005/0034002 A1 2/2005 Flautner
2005/0052621 A1 3/2005 Allen et al.
2005/0093719 A1 5/2005 Okamoto et al.
2005/0128212 A1 6/2005 Edecker et al.
2005/0157159 A1 7/2005 Komiya et al.
2005/0177385 A1 8/2005 Hull
2005/0231599 A1 10/2005 Yamasaki
2005/0273792 A1 12/2005 Inohara et al.
2006/0013435 A1 1/2006 Rhoads
2006/0015821 A1 1/2006 Jacques Parker et al.
2006/0019723 A1 1/2006 Vorenkamp
2006/0038880 A1 2/2006 Starkweather et al.
2006/0050224 A1 3/2006 Smith
2006/0090092 A1 4/2006 Verhulst
2006/0126181 A1 6/2006 Levola
2006/0126182 A1 6/2006 Levola
2006/0129852 A1 6/2006 Bonola
2006/0132914 A1 6/2006 Weiss et al.
2006/0179329 A1 8/2006 Terechko
2006/0221448 A1 10/2006 Nivon et al.
2006/0228073 A1 10/2006 Mukawa et al.
2006/0250322 A1 11/2006 Hall et al.
2006/0259621 A1 11/2006 Ranganathan
2006/0268220 A1 11/2006 Hogan
2007/0058248 A1 3/2007 Nguyen et al.
2007/0103836 A1 5/2007 Oh
2007/0124730 A1 5/2007 Pytel
2007/0159673 A1 7/2007 Freeman et al.
2007/0185398 A1 8/2007 Kimura et al.
2007/0188837 A1 8/2007 Shimizu et al.
2007/0198886 A1 8/2007 Saito
2007/0204672 A1 9/2007 Huang et al.
2007/0213952 A1 9/2007 Cirelli
2007/0283247 A1 12/2007 Brenneman et al.
2008/0002259 A1 1/2008 Ishizawa et al.
2008/0002260 A1 1/2008 Arrouy et al.
2008/0030429 A1 2/2008 Hailpern
2008/0043334 A1 2/2008 Itzkovitch et al.
2008/0046773 A1 2/2008 Ham
2008/0050013 A1 2/2008 Munro
2008/0063802 A1 3/2008 Maula et al.
2008/0068557 A1 3/2008 Menduni et al.
2008/0125218 A1 5/2008 Collins
2008/0146942 A1 6/2008 Dala-Krishna
2008/0173036 A1 7/2008 Willaims
2008/0177506 A1 7/2008 Kim
2008/0183190 A1 7/2008 Adcox et al.
2008/0205838 A1 8/2008 Crippa et al.
2008/0215907 A1 9/2008 Wilson
2008/0225393 A1 9/2008 Rinko
2008/0235570 A1 9/2008 Sawada et al.
2008/0246693 A1 10/2008 Hailpern et al.
2008/0316768 A1 12/2008 Travis
2009/0076791 A1 3/2009 Rhoades et al.
2009/0091583 A1 4/2009 McCoy
2009/0153797 A1 6/2009 Allon et al.
2009/0177445 A1 7/2009 Capps, Jr. et al.
2009/0224416 A1 9/2009 Laakkonen et al.
2009/0245730 A1 10/2009 Kleemann
2009/0287728 A1 11/2009 Martine et al.
2009/0300528 A1 12/2009 Stambaugh
2009/0310633 A1 12/2009 Ikegami
2010/0005326 A1 1/2010 Archer
2010/0019962 A1 1/2010 Fujita
2010/0056274 A1 3/2010 Uusitalo et al.
2010/0060970 A1 3/2010 Harris et al.
2010/0060979 A1 3/2010 Harris et al.
2010/0063854 A1 3/2010 Purvis et al.
2010/0070378 A1 3/2010 Trotman et al.
2010/0079841 A1 4/2010 Levola
2010/0115428 A1 5/2010 Shuping et al.
2010/0153934 A1 6/2010 Lachner
2010/0194632 A1 8/2010 Raento et al.
2010/0205541 A1 8/2010 Rappaport et al.
2010/0214284 A1 8/2010 Rieffel et al.
2010/0232016 A1 9/2010 Landa et al.
2010/0232031 A1 9/2010 Batchko et al.
2010/0244168 A1 9/2010 Shiozawa et al.
2010/0274567 A1 10/2010 Carlson et al.
2010/0274627 A1 10/2010 Carlson
2010/0277803 A1 11/2010 Pockett et al.
2010/0284085 A1 11/2010 Laakkonen
2010/0287485 A1 11/2010 Bertolami et al.
2010/0296163 A1* 11/2010 Saarikko .............. G02B 5/1814
359/569
2010/0306715 A1 12/2010 Geisner et al.
2010/0309687 A1 12/2010 Sampsell et al.
2010/0321781 A1* 12/2010 Levola ............... G02B 27/4272
359/569
2011/0010636 A1 1/2011 Hamilton, II et al.
2011/0021263 A1 1/2011 Anderson et al.
2011/0022870 A1 1/2011 Mcgrane
2011/0041083 A1 2/2011 Gabai et al.
2011/0050640 A1 3/2011 Lundback et al.
2011/0050655 A1 3/2011 Mukawa
2011/0064268 A1 3/2011 Cobb et al.
2011/0122240 A1 5/2011 Becker
2011/0145617 A1 6/2011 Thomson et al.
2011/0170801 A1 7/2011 Lu et al.
2011/0182515 A1 7/2011 Iwai et al.
2011/0218733 A1 9/2011 Hamza et al.
2011/0286735 A1 11/2011 Temblay
2011/0291969 A1 12/2011 Rashid et al.

(56) References Cited

U.S. PATENT DOCUMENTS

| | | | |
|---|---|---|---|
| 2011/0317233 | A1 | 12/2011 | Hayashibe et al. |
| 2012/0011389 | A1 | 1/2012 | Driesen |
| 2012/0050535 | A1 | 3/2012 | Densham et al. |
| 2012/0075501 | A1 | 3/2012 | Oyagi et al. |
| 2012/0079466 | A1 | 3/2012 | Gonion |
| 2012/0081392 | A1 | 4/2012 | Arthur |
| 2012/0089854 | A1 | 4/2012 | Breakstone |
| 2012/0113235 | A1 | 5/2012 | Shintani |
| 2012/0127062 | A1 | 5/2012 | Bar-Zeev et al. |
| 2012/0154557 | A1 | 6/2012 | Perez et al. |
| 2012/0215094 | A1 | 8/2012 | Rahimian et al. |
| 2012/0218301 | A1 | 8/2012 | Miller |
| 2012/0246506 | A1 | 9/2012 | Knight |
| 2012/0249416 | A1 | 10/2012 | Maciocci et al. |
| 2012/0249741 | A1 | 10/2012 | Maciocci et al. |
| 2012/0260083 | A1 | 10/2012 | Andrews |
| 2012/0280348 | A1 | 11/2012 | Chou et al. |
| 2012/0307075 | A1 | 12/2012 | Margalit |
| 2012/0307362 | A1 | 12/2012 | Silverstein et al. |
| 2012/0314959 | A1 | 12/2012 | White et al. |
| 2012/0320460 | A1 | 12/2012 | Levola |
| 2012/0326948 | A1 | 12/2012 | Crocco et al. |
| 2013/0021486 | A1 | 1/2013 | Richardon |
| 2013/0050258 | A1 | 2/2013 | Liu et al. |
| 2013/0050642 | A1 | 2/2013 | Lewis et al. |
| 2013/0050833 | A1 | 2/2013 | Lewis et al. |
| 2013/0051730 | A1 | 2/2013 | Travers et al. |
| 2013/0061240 | A1 | 3/2013 | Yan et al. |
| 2013/0077049 | A1 | 3/2013 | Bohn |
| 2013/0077170 | A1 | 3/2013 | Ukuda |
| 2013/0094148 | A1 | 4/2013 | Sloane |
| 2013/0129282 | A1 | 5/2013 | Li |
| 2013/0162940 | A1 | 6/2013 | Kurtin et al. |
| 2013/0169923 | A1 | 7/2013 | Schnoll et al. |
| 2013/0205126 | A1 | 8/2013 | Kruglick |
| 2013/0222386 | A1 | 8/2013 | Tannhauser et al. |
| 2013/0268257 | A1 | 10/2013 | Hu |
| 2013/0278633 | A1 | 10/2013 | Ahn et al. |
| 2013/0308861 | A1 | 11/2013 | Cordara |
| 2013/0314789 | A1 | 11/2013 | Saarikko et al. |
| 2013/0318276 | A1 | 11/2013 | Dalal |
| 2013/0336138 | A1 | 12/2013 | Venkatraman et al. |
| 2013/0342564 | A1 | 12/2013 | Kinnebrew et al. |
| 2013/0342570 | A1 | 12/2013 | Kinnebrew et al. |
| 2013/0342571 | A1 | 12/2013 | Kinnebrew et al. |
| 2013/0343408 | A1 | 12/2013 | Cook |
| 2014/0002329 | A1 | 1/2014 | Nishimaki et al. |
| 2014/0013098 | A1 | 1/2014 | Yeung |
| 2014/0016821 | A1 | 1/2014 | Arth et al. |
| 2014/0022819 | A1 | 1/2014 | Oh et al. |
| 2014/0078023 | A1 | 3/2014 | Ikeda et al. |
| 2014/0082526 | A1 | 3/2014 | Park et al. |
| 2014/0119598 | A1 | 5/2014 | Ramachandran et al. |
| 2014/0123015 | A1 | 5/2014 | Sako et al. |
| 2014/0126769 | A1 | 5/2014 | Reitmayr et al. |
| 2014/0140653 | A1 | 5/2014 | Brown et al. |
| 2014/0149573 | A1 | 5/2014 | Tofighbakhsh et al. |
| 2014/0168260 | A1 | 6/2014 | O'Brien et al. |
| 2014/0204438 | A1 | 7/2014 | Yamada et al. |
| 2014/0244983 | A1 | 8/2014 | McDonald et al. |
| 2014/0266987 | A1 | 9/2014 | Magyari |
| 2014/0267419 | A1 | 9/2014 | Ballard et al. |
| 2014/0274391 | A1 | 9/2014 | Stafford |
| 2014/0282105 | A1 | 9/2014 | Nordstrom |
| 2014/0292645 | A1 | 10/2014 | Tsurumi et al. |
| 2014/0306866 | A1 | 10/2014 | Miller et al. |
| 2014/0313228 | A1 | 10/2014 | Kasahara |
| 2014/0340498 | A1 | 11/2014 | Plagemann et al. |
| 2014/0359589 | A1 | 12/2014 | Kodosky et al. |
| 2014/0375680 | A1 | 12/2014 | Ackerman et al. |
| 2015/0005785 | A1 | 1/2015 | Olson |
| 2015/0009099 | A1 | 1/2015 | Queen |
| 2015/0077312 | A1 | 3/2015 | Wang |
| 2015/0097719 | A1 | 4/2015 | Balachandreswaran et al. |
| 2015/0123966 | A1 | 5/2015 | Newman |
| 2015/0130790 | A1 | 5/2015 | Vazquez, II et al. |
| 2015/0132003 | A1* | 5/2015 | Greiner ................ G02B 6/4215 398/87 |
| 2015/0132596 | A1 | 5/2015 | Yamada et al. |
| 2015/0134995 | A1 | 5/2015 | Park et al. |
| 2015/0138248 | A1 | 5/2015 | Schrader |
| 2015/0155939 | A1 | 6/2015 | Oshima et al. |
| 2015/0168221 | A1 | 6/2015 | Mao et al. |
| 2015/0205126 | A1 | 7/2015 | Schowengerdt |
| 2015/0235427 | A1 | 8/2015 | Nobori et al. |
| 2015/0235431 | A1 | 8/2015 | Schowengerdt |
| 2015/0253651 | A1 | 9/2015 | Russell et al. |
| 2015/0256484 | A1 | 9/2015 | Cameron |
| 2015/0269784 | A1 | 9/2015 | Miyawaki et al. |
| 2015/0294483 | A1 | 10/2015 | Wells et al. |
| 2015/0301955 | A1 | 10/2015 | Yakovenko et al. |
| 2015/0310657 | A1 | 10/2015 | Eden |
| 2015/0316982 | A1 | 11/2015 | Miller |
| 2015/0338915 | A1 | 11/2015 | Publicover et al. |
| 2015/0355481 | A1 | 12/2015 | Hilkes et al. |
| 2016/0004102 | A1 | 1/2016 | Nisper et al. |
| 2016/0015470 | A1 | 1/2016 | Border |
| 2016/0027215 | A1 | 1/2016 | Burns et al. |
| 2016/0033770 | A1 | 2/2016 | Fujimaki et al. |
| 2016/0051217 | A1 | 2/2016 | Douglas et al. |
| 2016/0073069 | A1 | 3/2016 | Xue |
| 2016/0077338 | A1 | 3/2016 | Robbins et al. |
| 2016/0085285 | A1 | 3/2016 | Mangione-Smith |
| 2016/0085300 | A1 | 3/2016 | Robbins et al. |
| 2016/0091720 | A1 | 3/2016 | Stafford et al. |
| 2016/0093099 | A1 | 3/2016 | Bridges |
| 2016/0093269 | A1 | 3/2016 | Buckley et al. |
| 2016/0103326 | A1 | 4/2016 | Kimura et al. |
| 2016/0123745 | A1 | 5/2016 | Cotier et al. |
| 2016/0139402 | A1 | 5/2016 | Lapstun |
| 2016/0139411 | A1 | 5/2016 | Kang et al. |
| 2016/0155273 | A1 | 6/2016 | Lyren et al. |
| 2016/0163063 | A1 | 6/2016 | Ashman |
| 2016/0180596 | A1 | 6/2016 | Gonzalez del Rosario |
| 2016/0187654 | A1 | 6/2016 | Border et al. |
| 2016/0191887 | A1 | 6/2016 | Casas |
| 2016/0202496 | A1 | 7/2016 | Billetz et al. |
| 2016/0217624 | A1 | 7/2016 | Finn et al. |
| 2016/0266412 | A1 | 9/2016 | Yoshida |
| 2016/0267708 | A1 | 9/2016 | Nistico et al. |
| 2016/0274733 | A1 | 9/2016 | Hasegawa et al. |
| 2016/0277645 | A1 | 9/2016 | Bitouk |
| 2016/0287337 | A1 | 10/2016 | Aram et al. |
| 2016/0300388 | A1 | 10/2016 | Stafford et al. |
| 2016/0321551 | A1 | 11/2016 | Priness et al. |
| 2016/0327798 | A1 | 11/2016 | Xiao et al. |
| 2016/0334279 | A1 | 11/2016 | Mittleman et al. |
| 2016/0357255 | A1 | 12/2016 | Lindh et al. |
| 2016/0370404 | A1 | 12/2016 | Quadrat et al. |
| 2016/0370510 | A1 | 12/2016 | Thomas |
| 2017/0038607 | A1 | 2/2017 | Camara |
| 2017/0060225 | A1 | 3/2017 | Zha et al. |
| 2017/0061696 | A1 | 3/2017 | Li et al. |
| 2017/0064066 | A1 | 3/2017 | Das et al. |
| 2017/0068020 | A1 | 3/2017 | Batchko et al. |
| 2017/0100664 | A1 | 4/2017 | Osterhout et al. |
| 2017/0102544 | A1 | 4/2017 | Vallius et al. |
| 2017/0115487 | A1 | 4/2017 | Travis |
| 2017/0118452 | A1 | 4/2017 | Ogi et al. |
| 2017/0122725 | A1 | 5/2017 | Yeoh et al. |
| 2017/0123526 | A1 | 5/2017 | Trail et al. |
| 2017/0127295 | A1 | 5/2017 | Black et al. |
| 2017/0131569 | A1 | 5/2017 | Aschwanden et al. |
| 2017/0147066 | A1 | 5/2017 | Katz et al. |
| 2017/0160518 | A1 | 6/2017 | Lanman et al. |
| 2017/0161951 | A1 | 6/2017 | Fix et al. |
| 2017/0172409 | A1 | 6/2017 | Cavin et al. |
| 2017/0185261 | A1 | 6/2017 | Perez et al. |
| 2017/0192239 | A1 | 7/2017 | Nakamura et al. |
| 2017/0201709 | A1 | 7/2017 | Igarashi et al. |
| 2017/0205903 | A1 | 7/2017 | Miller et al. |
| 2017/0206668 | A1 | 7/2017 | Poulos et al. |
| 2017/0213388 | A1 | 7/2017 | Margolis et al. |
| 2017/0214893 | A1 | 7/2017 | Naftali et al. |

(56) References Cited

U.S. PATENT DOCUMENTS

| | | | |
|---|---|---|---|
| 2017/0214907 | A1 | 7/2017 | Lapstun |
| 2017/0219841 | A1 | 8/2017 | Popovich et al. |
| 2017/0220119 | A1 | 8/2017 | Potts et al. |
| 2017/0221225 | A1 | 8/2017 | Peri |
| 2017/0232345 | A1 | 8/2017 | Rofougaran et al. |
| 2017/0235126 | A1 | 8/2017 | DiDomenico |
| 2017/0235129 | A1 | 8/2017 | Kamakura |
| 2017/0235142 | A1 | 8/2017 | Wall et al. |
| 2017/0235144 | A1 | 8/2017 | Piskunov et al. |
| 2017/0235147 | A1 | 8/2017 | Kamakura |
| 2017/0243403 | A1 | 8/2017 | Daniels et al. |
| 2017/0246070 | A1 | 8/2017 | Osterhout et al. |
| 2017/0254832 | A1 | 9/2017 | Ho et al. |
| 2017/0256096 | A1 | 9/2017 | Faaborg et al. |
| 2017/0258526 | A1 | 9/2017 | Lang |
| 2017/0266529 | A1 | 9/2017 | Reikmoto |
| 2017/0270712 | A1 | 9/2017 | Tyson et al. |
| 2017/0281054 | A1 | 10/2017 | Stever et al. |
| 2017/0287376 | A1 | 10/2017 | Bakar et al. |
| 2017/0293141 | A1 | 10/2017 | Schowengerdt et al. |
| 2017/0307886 | A1 | 10/2017 | Stenberg et al. |
| 2017/0307891 | A1 | 10/2017 | Bucknor et al. |
| 2017/0312032 | A1 | 11/2017 | Amanatullah et al. |
| 2017/0322418 | A1 | 11/2017 | Liu et al. |
| 2017/0322426 | A1 | 11/2017 | Tervo |
| 2017/0329137 | A1 | 11/2017 | Tervo |
| 2017/0332098 | A1 | 11/2017 | Rusanovskyy et al. |
| 2017/0336636 | A1 | 11/2017 | Amitai et al. |
| 2017/0336867 | A1 | 11/2017 | Wilairat et al. |
| 2017/0357332 | A1 | 12/2017 | Balan et al. |
| 2017/0363871 | A1* | 12/2017 | Vallius ................. G02B 6/0016 |
| 2017/0371394 | A1 | 12/2017 | Chan |
| 2017/0371661 | A1 | 12/2017 | Sparling |
| 2018/0014266 | A1 | 1/2018 | Chen |
| 2018/0024289 | A1 | 1/2018 | Fattal |
| 2018/0039673 | A1 | 2/2018 | Chen et al. |
| 2018/0044173 | A1 | 2/2018 | Netzer |
| 2018/0052007 | A1 | 2/2018 | Teskey et al. |
| 2018/0052501 | A1 | 2/2018 | Jones, Jr. et al. |
| 2018/0056305 | A1 | 3/2018 | Sankey et al. |
| 2018/0059305 | A1 | 3/2018 | Popovich et al. |
| 2018/0067779 | A1 | 3/2018 | Pillalamarri et al. |
| 2018/0070855 | A1 | 3/2018 | Eichler |
| 2018/0082480 | A1 | 3/2018 | White et al. |
| 2018/0084245 | A1 | 3/2018 | Lapstun |
| 2018/0088185 | A1 | 3/2018 | Woods et al. |
| 2018/0101214 | A1 | 4/2018 | Mahindru et al. |
| 2018/0102981 | A1 | 4/2018 | Kurtzman et al. |
| 2018/0108179 | A1 | 4/2018 | Tomlin et al. |
| 2018/0114298 | A1 | 4/2018 | Malaika et al. |
| 2018/0129112 | A1 | 5/2018 | Osterhout |
| 2018/0131907 | A1 | 5/2018 | Schmirler et al. |
| 2018/0136466 | A1 | 5/2018 | Ko |
| 2018/0144691 | A1 | 5/2018 | Choi et al. |
| 2018/0150971 | A1 | 5/2018 | Adachi et al. |
| 2018/0151796 | A1 | 5/2018 | Akahane |
| 2018/0172995 | A1 | 6/2018 | Lee et al. |
| 2018/0188115 | A1 | 7/2018 | Hsu et al. |
| 2018/0189568 | A1 | 7/2018 | Powderly et al. |
| 2018/0190017 | A1 | 7/2018 | Mendez et al. |
| 2018/0191990 | A1 | 7/2018 | Motoyama et al. |
| 2018/0196084 | A1 | 7/2018 | Tustaniwskyj |
| 2018/0217395 | A1 | 8/2018 | Lin et al. |
| 2018/0218545 | A1 | 8/2018 | Garcia et al. |
| 2018/0250589 | A1 | 9/2018 | Cossairt et al. |
| 2018/0260218 | A1 | 9/2018 | Gopal |
| 2018/0284877 | A1 | 10/2018 | Klein |
| 2018/0292654 | A1 | 10/2018 | Wall et al. |
| 2018/0299678 | A1 | 10/2018 | Singer et al. |
| 2018/0357472 | A1 | 12/2018 | Dreessen |
| 2019/0005069 | A1 | 1/2019 | Filgueiras de Araujo et al. |
| 2019/0011691 | A1 | 1/2019 | Peyman |
| 2019/0056591 | A1 | 2/2019 | Tervo et al. |
| 2019/0087015 | A1 | 3/2019 | Lam et al. |
| 2019/0101758 | A1 | 4/2019 | Zhu et al. |
| 2019/0107723 | A1 | 4/2019 | Lee et al. |
| 2019/0137788 | A1 | 5/2019 | Suen |
| 2019/0155034 | A1 | 5/2019 | Singer et al. |
| 2019/0155439 | A1 | 5/2019 | Mukherjee et al. |
| 2019/0158926 | A1 | 5/2019 | Kang et al. |
| 2019/0162950 | A1 | 5/2019 | Lapstun |
| 2019/0167095 | A1 | 6/2019 | Krueger |
| 2019/0171909 | A1 | 6/2019 | Mandal et al. |
| 2019/0172216 | A1 | 6/2019 | Ninan et al. |
| 2019/0178654 | A1 | 6/2019 | Hare |
| 2019/0179654 | A1 | 6/2019 | Hare |
| 2019/0182415 | A1 | 6/2019 | Sivan |
| 2019/0196690 | A1 | 6/2019 | Chong et al. |
| 2019/0206116 | A1 | 7/2019 | Xu et al. |
| 2019/0219815 | A1 | 7/2019 | Price et al. |
| 2019/0243123 | A1 | 8/2019 | Bohn |
| 2019/0287270 | A1 | 9/2019 | Nakamura et al. |
| 2019/0307510 | A1 | 10/2019 | Rotenberg et al. |
| 2019/0318502 | A1 | 10/2019 | He et al. |
| 2019/0318540 | A1 | 10/2019 | Piemonte et al. |
| 2019/0321728 | A1 | 10/2019 | Imai et al. |
| 2019/0347853 | A1 | 11/2019 | Chen et al. |
| 2019/0380792 | A1 | 12/2019 | Poltaretskyi et al. |
| 2019/0388182 | A1 | 12/2019 | Kumar et al. |
| 2020/0066045 | A1 | 2/2020 | Stahl et al. |
| 2020/0098188 | A1 | 3/2020 | Bar-Zeev et al. |
| 2020/0100057 | A1 | 3/2020 | Galon et al. |
| 2020/0110928 | A1 | 4/2020 | Al Jazaery et al. |
| 2020/0117267 | A1 | 4/2020 | Gibson et al. |
| 2020/0117270 | A1 | 4/2020 | Gibson et al. |
| 2020/0184217 | A1 | 6/2020 | Faulkner |
| 2020/0184653 | A1 | 6/2020 | Faulker |
| 2020/0202759 | A1 | 6/2020 | Ukai et al. |
| 2020/0242848 | A1 | 7/2020 | Ambler et al. |
| 2020/0309944 | A1 | 10/2020 | Thoresen et al. |
| 2020/0342571 | A1 | 10/2020 | Young et al. |
| 2020/0356161 | A1 | 11/2020 | Wagner |
| 2020/0368616 | A1 | 11/2020 | Delamont |
| 2020/0391115 | A1 | 12/2020 | Leeper et al. |
| 2020/0409528 | A1 | 12/2020 | Lee |
| 2021/0008413 | A1 | 1/2021 | Asikainen et al. |
| 2021/0033871 | A1 | 2/2021 | Jacoby et al. |
| 2021/0041951 | A1 | 2/2021 | Gibson et al. |
| 2021/0053820 | A1 | 2/2021 | Gurin et al. |
| 2021/0093391 | A1 | 4/2021 | Poltaretskyi et al. |
| 2021/0093410 | A1 | 4/2021 | Gaborit et al. |
| 2021/0093414 | A1 | 4/2021 | Moore et al. |
| 2021/0097886 | A1 | 4/2021 | Kuester et al. |
| 2021/0124901 | A1 | 4/2021 | Liu et al. |
| 2021/0132380 | A1 | 5/2021 | Wieczorek |
| 2021/0141225 | A1 | 5/2021 | Meynen et al. |
| 2021/0142582 | A1 | 5/2021 | Jones et al. |
| 2021/0150264 | A1 | 5/2021 | Karanam |
| 2021/0158023 | A1 | 5/2021 | Fu et al. |
| 2021/0158627 | A1 | 5/2021 | Cossairt et al. |
| 2021/0173480 | A1 | 6/2021 | Osterhout et al. |
| 2021/0319236 | A1 | 10/2021 | Tang |
| 2021/0333551 | A1* | 10/2021 | Schultz .................. G02B 30/34 |
| 2022/0366598 | A1 | 11/2022 | Azimi et al. |
| 2023/0351808 | A1* | 11/2023 | Jarvenpaa .......... G02B 27/0093 |
| 2023/0384593 | A1* | 11/2023 | Ofir .................... G02B 27/0944 |
| 2024/0103212 | A1* | 3/2024 | Jarvenpaa ............ G02B 6/0076 |
| 2025/0039342 | A1 | 1/2025 | Traczyk et al. |
| 2025/0189802 | A1* | 6/2025 | Ofir .................... G02B 27/0172 |

FOREIGN PATENT DOCUMENTS

| | | | |
|---|---|---|---|
| CN | 102448566 | A | 5/2012 |
| CN | 103460255 | A | 12/2013 |
| CN | 104040410 | A | 9/2014 |
| CN | 104603675 | A | 5/2015 |
| CN | 105938426 | A | 9/2016 |
| CN | 106662754 | A | 5/2017 |
| CN | 107004303 | A | 8/2017 |
| CN | 107683497 | A1 | 2/2018 |
| CN | 109223121 | A | 1/2019 |
| CN | 105190427 | B | 11/2019 |
| EP | 0504930 | A1 | 3/1992 |
| EP | 0535402 | A1 | 4/1993 |

(56) References Cited

FOREIGN PATENT DOCUMENTS

| | | | |
|---|---|---|---|
| EP | 0632360 | A1 | 1/1995 |
| EP | 1215522 | A2 | 6/2002 |
| EP | 13451682 | A2 | 2/2003 |
| EP | 1494110 | A2 | 1/2005 |
| EP | 1938141 | A1 | 7/2008 |
| EP | 1943556 | A2 | 7/2008 |
| EP | 2290428 | A2 | 3/2011 |
| EP | 2350774 | A1 | 8/2011 |
| EP | 2818910 | A1 | 12/2014 |
| EP | 1237067 | B1 | 1/2016 |
| EP | 3139245 | A1 | 3/2017 |
| EP | 3164776 | B1 | 5/2017 |
| EP | 3236211 | A1 | 10/2017 |
| EP | 2723240 | B1 | 8/2018 |
| EP | 2896986 | B1 | 2/2021 |
| GB | 2499635 | A | 8/2013 |
| GB | 2542853 | A | 4/2017 |
| IN | 938/DEL/2004 | A | 6/2006 |
| JP | H03-036974 | U | 4/1991 |
| JP | 09-121370 | A | 5/1997 |
| JP | H10-333094 | A | 12/1998 |
| JP | 2002-015222 | A | 1/2002 |
| JP | 2002-529806 | | 9/2002 |
| JP | 2003-029198 | A | 1/2003 |
| JP | 2003-141574 | A | 5/2003 |
| JP | 2003-228027 | A | 8/2003 |
| JP | 2003-329873 | A | 11/2003 |
| JP | 2004-348169 | A | 12/2004 |
| JP | 2005-151224 | A | 6/2005 |
| JP | 2005-303843 | A | 10/2005 |
| JP | 2007-012530 | A | 1/2007 |
| JP | 2007-86696 | A | 4/2007 |
| JP | 2007-273733 | A | 10/2007 |
| JP | 2008-257127 | A | 10/2008 |
| JP | 2009-090689 | A | 4/2009 |
| JP | 2009-244869 | A | 10/2009 |
| JP | 2010-014443 | A | 1/2010 |
| JP | 2010-139575 | | 6/2010 |
| JP | 2010-146030 | A | 7/2010 |
| JP | 2010-526341 | A | 7/2010 |
| JP | 2010-271526 | A | 12/2010 |
| JP | 2011-033993 | A | 2/2011 |
| JP | 2011-504522 | A | 2/2011 |
| JP | 2011-257203 | A | 12/2011 |
| JP | 2011-530131 | A | 12/2011 |
| JP | 2012-8356 | A | 1/2012 |
| JP | 2012-015774 | A | 1/2012 |
| JP | 2012-15774 | A | 1/2012 |
| JP | 2012-088777 | A | 5/2012 |
| JP | 2012-235036 | A | 11/2012 |
| JP | 2013-525872 | A1 | 6/2013 |
| JP | 2013-206322 | A | 10/2013 |
| JP | 2013-250045 | A | 12/2013 |
| JP | 2014-500522 | A | 1/2014 |
| JP | 2014-068465 | A | 4/2014 |
| JP | 2014-90386 | A | 5/2014 |
| JP | 2014-174366 | A | 9/2014 |
| JP | 2014-524229 | A | 9/2014 |
| JP | 2014-192550 | A | 10/2014 |
| JP | 2015-156512 | A | 8/2015 |
| JP | 2015-191032 | A | 11/2015 |
| JP | 2015-535986 | A | 12/2015 |
| JP | 2016-502120 | A | 1/2016 |
| JP | 2016-85463 | A | 5/2016 |
| JP | 2016-516227 | A | 6/2016 |
| JP | 2016-126134 | A | 7/2016 |
| JP | 2017-015697 | A | 1/2017 |
| JP | 2017-108444 | A | 6/2017 |
| JP | 2017-153498 | | 9/2017 |
| JP | 2017-531840 | A | 10/2017 |
| JP | 2017-535825 | A | 11/2017 |
| JP | 6232763 | B2 | 11/2017 |
| JP | 2018-014579 | A | 1/2018 |
| JP | 2018-503165 | A | 2/2018 |
| JP | 6333965 | B2 | 5/2018 |
| JP | 2018-173739 | A | 11/2018 |
| JP | 2019-177134 | A | 10/2019 |
| JP | 7344896 | B2 | 9/2023 |
| KR | 2005-0010775 | A | 1/2005 |
| KR | 10-2006-0059992 | A | 6/2006 |
| KR | 10-2011-0006408 | | 1/2011 |
| KR | 10-1372623 | B1 | 3/2014 |
| KR | 10-2017-0017243 | | 2/2017 |
| TW | 201219829 | A | 5/2012 |
| TW | 201803289 | A | 1/2018 |
| WO | 1991/000565 | A2 | 1/1991 |
| WO | 2000/030368 | A1 | 6/2000 |
| WO | 2002/071315 | A2 | 9/2002 |
| WO | 2004095248 | A | 11/2004 |
| WO | 2006132614 | A1 | 12/2006 |
| WO | 2007041678 | A2 | 4/2007 |
| WO | 2007/037089 | A1 | 5/2007 |
| WO | 2007/085628 | A1 | 8/2007 |
| WO | 2007/085682 | A1 | 8/2007 |
| WO | 2007/102144 | A1 | 9/2007 |
| WO | 2008137299 | A1 | 11/2008 |
| WO | 2008148927 | A1 | 12/2008 |
| WO | 2009060125 | A1 | 5/2009 |
| WO | 2009/101238 | A1 | 8/2009 |
| WO | 2010015807 | A1 | 2/2010 |
| WO | 2014203440 | A1 | 12/2010 |
| WO | 2012030787 | A2 | 3/2012 |
| WO | 2013/049012 | A1 | 4/2013 |
| WO | 2013062701 | A1 | 5/2013 |
| WO | 2013/145536 | A1 | 10/2013 |
| WO | 2014033306 | A1 | 3/2014 |
| WO | 2014047165 | A1 | 3/2014 |
| WO | 2015079610 | A1 | 6/2015 |
| WO | 2015/143641 | A1 | 10/2015 |
| WO | 2015194597 | A1 | 12/2015 |
| WO | 2016/054092 | A1 | 4/2016 |
| WO | 2017004695 | A1 | 1/2017 |
| WO | 2017044761 | A1 | 3/2017 |
| WO | 2017049163 | A1 | 3/2017 |
| WO | 2017051595 | A1 | 3/2017 |
| WO | 2017120475 | A1 | 7/2017 |
| WO | 2017176861 | A1 | 10/2017 |
| WO | 2017/203201 | A1 | 11/2017 |
| WO | 2018008232 | A1 | 1/2018 |
| WO | 2018/031261 | A1 | 2/2018 |
| WO | 2018022523 | A1 | 2/2018 |
| WO | 2018/044537 | A1 | 3/2018 |
| WO | 2018039273 | A1 | 3/2018 |
| WO | 2018057564 | A1 | 3/2018 |
| WO | 2018085287 | A1 | 5/2018 |
| WO | 2018087408 | A1 | 5/2018 |
| WO | 2018097831 | A1 | 5/2018 |
| WO | 2018/166921 | A | 9/2018 |
| WO | 2018166921 | A1 | 9/2018 |
| WO | 2018236587 | A1 | 12/2018 |
| WO | 2019040493 | A1 | 2/2019 |
| WO | 2016075689 | A1 | 5/2019 |
| WO | 2019148154 | A1 | 8/2019 |
| WO | 2020010226 | A1 | 1/2020 |

OTHER PUBLICATIONS

"Office Action mailed on Jul. 17, 2025 with English translation", Chinese Patent Application No. 202080079136.X, (42 pages).

"Penultimate Office Action mailed on Aug. 13, 2025 with English translation", Japanese Patent Application No. 2024-139589, (5 pages).

"ARToolKit: Hardware", https://web.archive.org/web/20051013062315/http://www.hitl.washington.edu:80/artoolkit/documentation/hardware.htm (downloaded Oct. 26, 2020), Oct. 13, 2015, (3 pages).

"Communication according to Rule 164(1) EPC mailed on Feb. 23, 2022", European Patent Application No. 20753144.3, (11 pages).

"Communication Pursuant to Article 94(3) EPC mailed on Sep. 4, 2019", European Patent Application No. 10793707.0, (4 pages).

"Communication Pursuant to Article 94(3) EPC mailed on Apr. 25, 2022", European Patent Application No. 18885707.2, (5 pages).

"Communication Pursuant to Article 94(3) EPC mailed on Feb. 28, 2023", European Patent Application No. 19845418.3, (6 Pages).

(56) References Cited

OTHER PUBLICATIONS

"Communication Pursuant to Article 94(3) EPC mailed on Jan. 4, 2022", European Patent Application No. 20154070.5, (8 pages).
"Communication Pursuant to Article 94(3) EPC mailed on Jul. 28, 2023", European Patent Application No. 19843487.0, (15 pages).
"Communication Pursuant to Article 94(3) EPC mailed on May 23, 2023", European Patent Application No. 18890390.0, (5 pages).
"Communication Pursuant to Article 94(3) EPC mailed on May 30, 2022", European Patent Application No. 19768418.6, (6 pages).
"Communication Pursuant to Article 94(3) EPC mailed on Oct. 21, 2021", European Patent Application No. 16207441.3, (4 pages).
"Communication Pursuant to Rule 164(1) EPC mailed on Feb. 23, 2022", European Patent Application No. 20753144.3, (11 pages).
"Communication Pursuant to Rule 164(1) EPC mailed on Jul. 27, 2021", European Patent Application No. 19833664.6, (11 pages).
"Decision of Rejection mailed on Jan. 5, 2023 with English translation", Chinese Patent Application No. 201880079474.6, (10 pages).
"European Search Report mailed on Oct. 15, 2020", European Patent Application No. 20180623.9, (10 pages).
"Extended European Search Report issued on Apr. 5, 2023", European Patent Application No. 20888716.6, (11 pages).
"Extended European Search Report issued on Dec. 14, 2022", European Patent Application No. 20886547.7, (8 pages).
"Extended European Search Report issued on Jul. 20, 2022", European Patent Application No. 19885958.9, (9 pages).
"Extended European Search Report issued on May 20, 2020", European Patent Application No. 20154070.5, (7 pages).
"Extended European Search Report issued on Jan. 22, 2021", European Patent Application No. 18890390.0, (11 pages).
"Extended European Search Report issued on Nov. 3, 2020", European Patent Application No. 18885707.2, (7 pages).
"Extended European Search Report issued on Jun. 30, 2021", European Patent Application No. 19811971.1, (9 pages).
"Extended European Search Report issued on Mar. 4, 2021", European Patent Application No. 19768418.6, (9 pages).
"Extended European Search Report issued on Nov. 4, 2020", European Patent Application No. 20190980.1, (14 pages).
"Extended European Search Report issued on Aug. 24, 2022", European Patent Application No. 20846338.0, (13 pages).
"Extended European Search Report issued on Aug. 8, 2022", European Patent Application No. 19898874.3, (8 pages).
"Extended European Search Report issued on Sep. 8, 2022", European Patent Application No. 20798769.4, (13 pages).
"Extended European Search Report mailed on Nov. 3, 2022", European Patent Application No. 20770244.0, (23 pages).
"Extended European Search Report mailed on Jun. 12, 2017", European Patent Application No. 16207441.3, (8 pages).
"Extended European Search Report mailed on Jan. 28, 2022", European Patent Application No. 19815876.8, (9 pages).
"Extended European Search Report mailed on Jan. 4, 2022", European Patent Application No. 19815085.6, (9 pages).
"Extended European Search Report mailed on Jul. 16, 2021", European Patent Application No. 19810142.0, (14 pages).
"Extended European Search Report mailed on Jul. 30, 2021", European Patent Application No. 19839970.1, (7 pages).
"Extended European Search Report mailed on Jun. 19, 2020", European Patent Application No. 20154750.2, (10 pages).
"Extended European Search Report mailed on Mar. 22, 2022", European Patent Application No. 19843487.0, (14 pages).
"Extended European Search Report mailed on May 16, 2022", European Patent Application No. 19871001.4, (9 pages).
"Extended European Search Report mailed on May 30, 2022", European Patent Application No. 20753144.3, (10 pages).
"Extended European Search Report mailed on Oct. 27, 2021", European Patent Application No. 19833664.6, (10 pages).
"Extended European Search Report mailed on Sep. 20, 2021", European Patent Application No. 19851373.1, (8 pages).
"Extended European Search Report mailed on Sep. 28, 2021", European Patent Application No. 19845418.3, (13 pages).
"Final Office Action mailed on Aug. 10, 2020", U.S. Appl. No. 16/225,961, (13 pages).
"Final Office Action mailed on Dec. 29, 2022", U.S. Appl. No. 17/098,059, (32 pages).
"Final Office Action mailed on Dec. 4, 2019", U.S. Appl. No. 15/564,517, (15 pages).
"Final Office Action mailed on Feb. 19, 2020", U.S. Appl. No. 15/552,897, (17 pages).
"Final Office Action mailed on Feb. 23, 2022", U.S. Appl. No. 16/748,193, (23 pages).
"Final Office Action mailed on Feb. 3, 2022", U.S. Appl. No. 16/864,721, (36 pages).
"Final Office Action mailed on Jul. 13, 2022", U.S. Appl. No. 17/262,991, (18 pages).
"Final Office Action mailed on Jun. 15, 2021", U.S. Appl. No. 16/928,313, (42 pages).
"Final Office Action mailed on Mar. 1, 2021", U.S. Appl. No. 16/214,575, (29 pages).
"Final Office Action mailed on Mar. 10, 2023", U.S. Appl. No. 17/357,795, (15 pages).
"Final Office Action mailed on Mar. 19, 2021", U.S. Appl. No. 16/530,776, (25 pages).
"Final Office Action mailed on Nov. 24, 2020", U.S. Appl. No. 16/435,933, (44 pages).
"Final Office Action mailed on Sep. 17, 2021", U.S. Appl. No. 16/938,782, (44 pages).
"First Examination Report Mailed on Aug. 8, 2023", Australian Patent Application No. 2018379105, (3 pages).
"First Examination Report Mailed on Dec. 8, 2022", Australian Patent Application No. 2018392482, (3 pages).
"First Examination Report Mailed on Jul. 27, 2022", Chinese Patent Application No. 201980036675.2, (5 pages).
"First Examination Report Mailed on Jul. 28, 2022", Indian Patent Application No. 202047024232, (6 pages).
"First Examination Report Mailed on May 13, 2022", Indian Patent Application No. 202047026359, (8 pages).
"First Office Action mailed Apr. 21, 2023 with English translation", Japanese Patent Application No. 2021-509779, (26 pages).
"First Office Action mailed Jul. 4, 2023 with English translation", Japanese Patent Application No. 2021-505669, (6 pages).
"First Office Action mailed on Apr. 13, 2023 with English Translation", Japanese Patent Application No. 2020-567766, (7 pages).
"First Office Action mailed on Dec. 22, 2022 with English translation", Chinese Patent Application No. 201980061450.2, (11 pages).
"First Office Action mailed on Feb. 11, 2022 with English translation", Chinese Patent Application No. 201880089255.6, (17 pages).
"First Office Action mailed on Jan. 24, 2023 with English translation", Japanese Patent Application No. 2020-549034, (7 pages).
"First Office Action mailed on Jan. 30, 2023 with English translation", Chinese Patent Application No. 201980082951.9, (5 pages).
"First Office Action mailed on Jun. 13, 2023 with English translation", Japanese Patent Application No. 2020-567853, (7 pages).
"First Office Action mailed on Mar. 14, 2022 with English translation", Chinese Patent Application No. 201880079474.6, (11 pages).
"First Office Action mailed on Mar. 27, 2023 with English translation", Japanese Patent Application No. 2020-566617, (6 pages).
"First Office Action mailed on Mar. 6, 2023 with English translation", Korean Patent Application No. 10-2020-7019685, (7 pages).
"First Office Action mailed on May 26, 2023 with English translation", Japanese Patent Application No. 2021-500607, (6 pages).
"First Office Action mailed on May 30, 2023", Israeli Patent Application No. 275065, (4 pages).
"First Office Action mailed on May 30, 2023 with English translation", Japanese Patent Application No. 2021-519873, (8 pages).
"First Office Action mailed on Sep. 16, 2022 with English translation", Chinese Patent Application No. 201980063642.7, (7 pages).
"FS_XR5G: Permanent document, v0.4.0", Qualcomm Incorporated, 3GPP TSG-SA 4 Meeting 103 retrieved from the Internet: URL:http://www.3gpp.org/ftp/Meetings%5F3GPP%5FSYNC/SA4/Docs/S4%2DI90526%2Ezip [retrieved on Apr. 12, 2019] , Apr. 12, 2019 , (98 pages).

(56) References Cited

OTHER PUBLICATIONS

"International Search Report and Written Opinion mailed on Feb. 12, 2021", International PCT Application No. PCT/US20/60555, (25 pages).
"International Search Report and Written Opinion mailed on Mar. 12, 2020", International PCT Patent Application No. PCT/US19/67919, (14 pages).
"International Search Report and Written Opinion mailed on Aug. 15, 2019", International PCT Patent Application No. PCT/US19/33987, (20 pages).
"International Search Report and Written Opinion mailed on Jun. 15, 2020", International PCT Patent Application No. PCT/US2020/017023, (13 pages).
"International Search Report and Written Opinion mailed on Oct. 16, 2019", International PCT Patent Application No. PCT/US19/43097, (10 pages).
"International Search Report and Written Opinion mailed on Oct. 16, 2019", International PCT Patent Application No. PCT/US19/36275, (10 pages).
"International Search Report and Written Opinion mailed on Oct. 16, 2019", International PCT Patent Application No. PCT/US19/43099, (9 pages).
"International Search Report and Written Opinion mailed on Jun. 17, 2016", International PCT Patent Application No. PCT/FI2016/050172, (9 pages).
"International Search Report and Written Opinion mailed on Feb. 2, 2021", International PCT Patent Application No. PCT/US20/60550, (9 pages).
"International Search Report and Written Opinion mailed on Oct. 22, 2019", International PCT Patent Application No. PCT/US19/43751, (9 pages).
"International Search Report and Written Opinion mailed on Dec. 23, 2019", International PCT Patent Application No. PCT/US19/44953, (11 pages).
"International Search Report and Written Opinion mailed on May 23, 2019", International PCT Patent Application No. PCT/US18/66514, (17 pages).
"International Search Report and Written Opinion mailed on Sep. 26, 2019", International PCT Patent Application No. PCT/US19/40544, (12 pages).
"International Search Report and Written Opinion mailed on Aug. 27, 2019", International PCT Application No. PCT/US2019/035245, (8 pages).
"International Search Report and Written Opinion mailed on Dec. 27, 2019", International PCT Application No. PCT/US19/47746, (16 pages).
"International Search Report and Written Opinion mailed on Dec. 3, 2020", International PCT Patent Application No. PCT/US20/43596, (25 pages).
"International Search Report and Written Opinion mailed on Sep. 30, 2019", International PCT Patent Application No. PCT/US19/40324, (7 pages).
"International Search Report and Written Opinion mailed on Sep. 4, 2020", International PCT Patent Application No. PCT/US20/31036, (13 pages).
"International Search Report and Written Opinion mailed on Jun. 5, 2020", International PCT Patent Application No. PCT/US20/19871, (9 pages).
"International Search Report and Written Opinion mailed on Aug. 8, 2019", International PCT Patent Application No. PCT/US2019/034763, (8 pages).
"International Search Report and Written Opinion mailed on Oct. 8, 2019", International PCT Patent Application No. PCT/US19/41151, (7 pages).
"International Search Report and Written Opinion mailed on Jan. 9, 2020", International PCT Application No. PCT/US19/55185, (10 pages).
"International Search Report and Written Opinion mailed on Feb. 28, 2019", International PCT Patent Application No. PCT/US18/64686, (8 pages).
"International Search Report and Written Opinion mailed on Feb. 7, 2020", International PCT Patent Application No. PCT/US2019/061265, (11 pages).
"International Search Report and Written Opinion mailed on Jun. 11, 2019", International PCT Application No. PCT/US19/22620, (7 pages).
"Invitation to Pay Additional Fees mailed Aug. 15, 2019", International PCT Patent Application No. PCT/US19/36275, (2 pages).
"Invitation to Pay Additional Fees mailed Sep. 24, 2020", International PCT Patent Application No. PCT/US2020/043596, (3 pages).
"Invitation to Pay Additional Fees mailed on Oct. 22, 2019", International PCT Patent Application No. PCT/US19/47746, (2 pages).
"Invitation to Pay Additional Fees mailed on Apr. 3, 2020", International PCT Patent Application No. PCT/US20/17023, (2 pages).
"Invitation to Pay Additional Fees mailed on Oct. 17, 2019", International PCT Patent Application No. PCT/US19/44953, (2 pages).
"Multi-core processor", TechTarget , 2013 , (1 page).
"Non Final Office Action mailed Nov. 19. 2019", U.S. Appl. No. 16/355,611, (31 pages).
"Non Final Office Action mailed on Apr. 1, 2022", U.S. Appl. No. 17/256,961, (65 pages).
"Non Final Office Action mailed on Apr. 11, 2022", U.S. Appl. No. 16/938,782, (52 pages).
"Non Final Office Action mailed on Apr. 12, 2022", U.S. Appl. No. 17/262,991, (60 pages).
"Non Final Office Action mailed on Apr. 13, 2023", U.S. Appl. No. 17/098,043, (7 pages).
"Non Final Office Action mailed on Aug. 2, 2023", U.S. Appl. No. 17/807,600, (25 pages).
"Non Final Office Action mailed on Aug. 21, 2019", U.S. Appl. No. 15/564,517, (14 pages).
"Non Final Office Action mailed on Aug. 4, 2021", U.S. Appl. No. 16/864,721, (21 pages).
"Non Final Office Action mailed on Dec. 7, 2022", U.S. Appl. No. 17/357,795, (63 pages).
"Non Final Office Action mailed on Feb. 2, 2022", U.S. Appl. No. 16/783,866, (8 pages).
"Non Final Office Action mailed on Feb. 3, 2023", U.S. Appl. No. 17/429,100, (16 pages).
"Non Final Office Action mailed on Feb. 3, 2023", U.S. Appl. No. 17/497,965, (32 pages).
"Non Final Office Action mailed on Jan. 24, 2023", U.S. Appl. No. 17/497,940, (10 pages).
"Non Final Office Action mailed on Jan. 26, 2021", U.S. Appl. No. 16/928,313, (33 pages).
"Non Final Office Action mailed on Jan. 27, 2021", U.S. Appl. No. 16/225,961, (15 pages).
"Non Final Office Action mailed on Jul. 20, 2023", U.S. Appl. No. 17/650,188, (11 pages).
"Non Final Office Action mailed on Jul. 26, 2022", U.S. Appl. No. 17/098,059, (28 pages).
"Non Final Office Action mailed on Jul. 27, 2020", U.S. Appl. No. 16/435,933, (16 pages).
"Non Final Office Action mailed on Jul. 9, 2021", U.S. Appl. No. 17/002,663, (43 pages).
"Non Final Office Action mailed on Jul. 9, 2021", U.S. Appl. No. 16/833,093, (47 pages).
"Non Final Office Action mailed on Jun. 10, 2021", U.S. Appl. No. 16/938,782, (40 Pages).
"Non Final Office Action mailed on Jun. 14, 2023", U.S. Appl. No. 17/516,483, (10 pages).
"Non Final Office Action mailed on Jun. 17, 2020", U.S. Appl. No. 16/682,911, (22 pages).
"Non Final Office Action mailed on Jun. 19, 2020", U.S. Appl. No. 16/225,961, (35 pages).
"Non Final Office Action mailed on Jun. 29, 2021", U.S. Appl. No. 16/698,588, (58 pages).
"Non Final Office Action mailed on Mar. 1, 2023", U.S. Appl. No. 18/046,739, (34 pages).
"Non Final Office Action mailed on Mar. 3, 2021", U.S. Appl. No. 16/427,337, (41 pages).

(56) References Cited

OTHER PUBLICATIONS

"Non Final Office Action mailed on Mar. 31, 2022", U.S. Appl. No. 17/257,814, (60 pages).
"Non Final Office Action mailed on Mar. 9, 2022", U.S. Appl. No. 16/870,676, (57 pages).
"Non Final Office Action mailed on May 10, 2022", U.S. Appl. No. 17/140,921, (25 pages).
"Non Final Office Action mailed on May 11, 2023", U.S. Appl. No. 17/822,279, (24 pages).
"Non Final Office Action mailed on May 17, 2022", U.S. Appl. No. 16/748,193, (11 pages).
"Non Final Office Action mailed on May 26, 2021", U.S. Appl. No. 16/214,575, (19 pages).
"Non Final Office Action mailed on Nov. 19, 2019", U.S. Appl. No. 16/355,611, (31 pages).
"Non Final Office Action mailed on Nov. 22, 2023", U.S. Appl. No. 17/268,376, (8 pages).
"Non Final Office Action mailed on Nov. 5, 2020", U.S. Appl. No. 16/530,776, (45 pages).
"Non Final Office Action mailed on Oct. 22, 2019", U.S. Appl. No. 15/859,277, (15 pages).
"Non Final Office Action mailed on Sep. 1, 2020", U.S. Appl. No. 16/214,575, (40 pages).
"Non Final Office Action mailed on Sep. 19, 2022", U.S. Appl. No. 17/263,001, (14 pages).
"Non Final Office Action mailed on Sep. 20, 2021", U.S. Appl. No. 17/105,848, (56 pages).
"Non Final Office Action mailed on Sep. 29, 2021", U.S. Appl. No. 16/748,193, (62 pages).
"Notice of Allowance mailed on Jul. 27, 2023 with English translation", Korean Patent Application No. 10-2020-7019685, (4 pages).
"Notice of Allowance mailed on Mar. 25, 2020", U.S. Appl. No. 15/564,517, (11 pages).
"Notice of Allowance mailed on Oct. 5, 2020", U.S. Appl. No. 16/682,911, (27 pages).
"Notice of Reason for Rejection mailed on Oct. 28, 2022 with English translation", Japanese Patent Application No. 2020-531452, (3 pages).
"Notice of Reason of Refusal mailed on Sep. 11, 2020 with English translation", Japanese Patent Application No. 2019-140435, (6 pages).
"Office Action mailed May 31, 2023", Israeli Patent Application No. 275373, (5 pages).
"Office Action mailed on Apr. 13, 2023 with English translation", Japanese Patent Application No. 2020-533730, (13 pages).
"Office Action mailed on Jul. 20, 2023 with English translation", Japanese Patent Application No. 2021-505884, (6 pages).
"Office Action mailed on Jun. 8, 2023 with English translation", Japanese Patent Application No. 2021-503762, (6 pages).
"Office Action mailed on Mar. 30, 2023 with English translation", Japanese Patent Application No. 2020-566620, (10 pages).
"Office Action mailed on Nov. 24, 2022 with English Translation", Japanese Patent Application No. 2020-533730, (11 pages).
"Phototourism Challenge", CVPR 2019 Image Matching Workshop. https://image matching-workshop. github.io., (16 pages).
"Second Office Action mailed on Jul. 13, 2022 with English Translation", Chinese Patent Application No. 201880079474.6, (10 pages).
"Second Office Action mailed on Jun. 20, 2022 with English Translation", Chinese Patent Application No. 201880089255.6, (14 pages).
"Second Office Action mailed on May 2, 2023 with English Translation", Japanese Patent Application No. 2020-549034, (6 pages).
"Summons to attend oral proceedings pursuant to Rule 115(1) EPC mailed on Jul. 15, 2019", European Patent Application No. 15162521.7, (7 pages).
"Wikipedia Dioptre", Jun. 22, 2018 (Jun. 22, 2018), XP093066995,Retrieved from the Internet: URL:https://en.wikipedia.org/w/index.php? title=Dioptre&direction=next&oldid=846451540 [retrieved on Jul. 25, 2023], (3 pages).
Aarik, J. , et al. , "Effect of crystal structure on optical properties of TiO2 films grown by atomic layer deposition", Thin Solid Films; Publication [online). May 19, 1998 [retrieved Feb. 19, 2020]. Retrieved from the Internet: <URL: https://www.sciencedirect.com/science/article/pii/S0040609097001351 ?via%3Dihub>; DOI: 10.1016/S0040-6090(97)00135-1; see entire document, (2 pages).
Altwaijry , et al. , "Learning to Detect and Match Keypoints with Deep Architectures", Proceedings of the British Machine Vision Conference (BMVC), BMVA Press, Sep. 2016, [retrieved on Jan. 8, 2021 (Jan. 8, 2021 )] < URL: http://www.bmva.org/bmvc/2016/papers/paper049/index.html >, en lire document, especially Abstract.
Anonymous, "Koi Pond: Top iPhone App Store Paid App", https://web.archive.org/web/20080904061233/https://www.iphoneincanada.ca/reviews /koi-pond-top-iphone-app-store-paid-app/—[retrieved on Aug. 9, 2022].
Arandjelović, Relja , et al. , "Three things everyone should know to improve object retrieval", CVPR, 2012, (8 pages).
Azom, "Silica—Silicon Dioxide (SiO2)", AZO Materials; Publication [Online]. Dec. 13, 2001 [retrieved Feb. 19, 2020]. Retrieved from the Internet: <URL: https://www.azom.com/article.aspx?Article1D=1114>.
Azuma, Ronald T. , "A Survey of Augmented Reality", Presence: Teleoperators and Virtual Environments 6, (Aug. 4, 1997), 355-385; https://web.archive.org/web/20010604100006/http://www.cs.unc.edu/~azuma/ ARpresence.pdf (downloaded Oct. 26, 2020).
Azuma, Ronald T. , "Predictive Tracking for Augmented Reality", Department of Computer Science, Chapel Hill NC; TR95-007, Feb. 1995, 262 pages.
Battaglia, Peter W, et al. , "Relational inductive biases, deep learning, and graph networks", arXiv:1806.01261, Oct. 17, 2018, pp. 1-40.
Berg, Alexander C , et al. , "Shape matching and object recognition using low distortion correspondences", In CVPR, 2005, (8 pages).
Bian, Jiawang , et al. , "GMS: Grid-based motion statistics for fast, ultra-robust feature correspondence.", In CVPR (Conference on Computer Vision and Pattern Recognition), 2017, (10 pages).
Bimber, Oliver , et al. , "Spatial Augmented Reality: Merging Real and Virtual Worlds", https://web.media.mit.edu/~raskar/book/BimberRaskarAugmentedRealityBook.pdf; published by A K Peters/CRC Press (Jul. 31, 2005); eBook (3rd Edition, 2007), (393 pages).
Brachmann, Eric , et al. , "Neural-Guided RANSAC: Learning Where to Sample Model Hypotheses", In ICCV (International Conference on Computer Vision ), arXiv:1905.04132v2 [cs.CV] Jul. 31, 2019, (17 pages).
Butail , et al. , "Putting the fish in the fish tank: Immersive VR for animal behavior experiments", In: 2012 IEEE International Conference on Robotics and Automation. May 18, 2012 (May 18, 2012) Retrieved on Nov. 14, 2020 (Nov. 14, 2020) from <http:/lcdcl.umd.edu/papers/icra2012.pdf> entire document.
Caetano, Tibério S , et al. , "Learning graph matching", IEEE TPAMI, 31(6):1048-1058, 2009.
Cech, Jan , et al. , "Efficient sequential correspondence selection by cosegmentation", IEEE TPAMI, 32(9):1568-1581, Sep. 2010.
Chittineni, C. , et al. , "Single filters for combined image geometric manipulation and enhancement", Proceedings of SPIE vol. 1903, Image and Video Processing, Apr. 8, 1993, San Jose, CA. (Year: 1993), pp. 111-121.
Cuturi, Marco, "Sinkhorn distances: Lightspeed computation of optimal transport", NIPS, 2013, (9 pages).
Dai, Angela , et al. , "ScanNet: Richly-annotated 3d reconstructions of indoor scenes", In CVPR, arXiv:1702.04405v2 [cs.CV] Apr. 11, 2017, (22 pages).
Deng, Haowen , et al. , "PPFnet: Global context aware local features for robust 3d point matching", In CVPR, arXiv:1802.02669v2 [cs.CV] Mar. 1, 2018, (12 pages).
Detone, Daniel , et al. , "Deep image homography estimation", In RSS Work-shop: Limits and Potentials of Deep Learning in Robotics, arXiv:1606.03798v1 [cs.CV] Jun. 13, 2016, (6 pages).
Detone, Daniel , et al. , "Self-improving visual odometry", arXiv:1812.03245, Dec. 8, 2018, (9 pages).

(56) References Cited

OTHER PUBLICATIONS

Detone, Daniel , et al. , "SuperPoint: Self-supervised interest point detection and description", In CVPR Workshop on Deep Learning for Visual SLAM, arXiv:1712.07629v4 [cs.CV] Apr. 19, 2018, (13 pages).
Dusmanu, Mihai , et al. , "D2-net: A trainable CNN for joint detection and description of local features", CVPR, arXiv:1905.03561v1 [cs.CV] May 9, 2019, (16 pages).
Ebel, Patrick , et al. , "Beyond cartesian representations for local descriptors", ICCV, arXiv:1908.05547v1 [cs.CV] Aug. 15, 2019, (11 pages).
Fischler, Martin A , et al. , "Random sample consensus: a paradigm for model fitting with applications to image analysis and automated cartography", Communications of the ACM, 24(6): 1981, pp. 381-395.
Gilmer, Justin , et al. , "Neural message passing for quantum chemistry", In ICML, arXiv:1704.01212v2 [cs.LG] Jun. 12, 2017, (14 pages).
Giuseppe, Donato , et al. , "Stereoscopic helmet mounted system for real time 3D environment reconstruction and indoor ego—motion estimation", Proc. SPIE 6955, Head- and Helmet-Mounted Displays XIII: Design and Applications, SPIE Defense and Security Symposium, 2008, Orlando, Florida, United States, 69550P.
Goodfellow, "Titanium Dioxide—Titania (TiO2)", AZO Materials; Publication [online]. Jan. 11, 2002 [retrieved Feb. 19, 2020]. Retrieved from the Internet: <URL: https://www.azom.com/article.aspx?Article1D=1179>.
Hartley, Richard , et al. , "Multiple View Geometry in Computer Vision", Cambridge University Press, 2003, pp. 1-673.
Jacob, Robert J.K. , "Eye Tracking in Advanced Interface Design", Human-Computer Interaction Lab, Naval Research Laboratory, Washington, D.C., date unknown. 2003, pp. 1-50.
Lee , et al. , "Self-Attention Graph Pooling", Cornell University Library/Computer Science/Machine Learning, Apr. 17, 2019 [retrieved on Jan. 8, 2021 from the Internet< URL: https://arxiv.org/abs/1904.08082 >, entire document.
Lee, Juho , et al. , "Set transformer: A frame-work for attention-based permutation-invariant neural networks", ICML, arXiv:1810.00825v3 [cs.LG] May 26, 2019, (17 pages).
Leordeanu, Marius , et al. , "A spectral technique for correspondence problems using pairwise constraints", Proceedings of (ICCV) International Conference on Computer Vision, vol. 2, pp. 1482-1489, Oct. 2005, (8 pages).
Levola, T., "Diffractive Optics for Virtual Reality Displays", Journal of the SID Eurodisplay 14/05, 2005, XP008093627, chapters 2-3, Figures 2 and 10, pp. 467-475.
Levola, Tapani, "Invited Paper: Novel Diffractive Optical Components for Near to Eye Displays—Nokia Research Center", SID 2006 Digest, 2006 SID International Symposium, Society for Information Display, vol. XXXVII, May 24, 2005, chapters 1-3, figures 1 and 3, pp. 64-67.
Li, Yujia , et al. , "Graph Matching Networks for Learning the Similarity of Graph Structured Objects", arxiv.org, Cornell University Library, 201 Olin Library Cornell University Ithaca, NY 14853, XP081268608.
Li, Yujia , et al. , "Graph matching networks for learning the similarity of graph structured objects", ICML, arXiv:1904.12787v2 [cs.LG] May 12, 2019, (18 pages).
Li, Zhengqi , et al. , "Megadepth: Learning single-view depth prediction from internet photos", In CVPR, fromarXiv: 1804.00607v4 [cs.CV] Nov. 28, 2018, (10 pages).
Libovicky , et al. , "Input Combination Strategies for Multi-Source Transformer Decoder", Proceedings of the Third Conference on Machine Translation (WMT). vol. 1: Research Papers, Belgium, Brussels, Oct. 31-Nov. 1, 2018; retrieved on Jan. 8, 2021 (Jan. 8, 2021 ) from < URL: https://doi.org/10.18653/v1/W18-64026 >, entire document.
Loiola, Eliane Maria, et al. , "A survey for the quadratic assignment problem", European journal of operational research, 176(2): 2007, pp. 657-690.
Lowe, David G , "Distinctive image features from scale-invariant keypoints", International Journal of Computer Vision, 60(2): 91-110, 2004, (28 pages).
Luo, Zixin , et al. , "ContextDesc: Local descriptor augmentation with cross-modality context", CVPR, arXiv:1904.04084v1 [cs.CV] Apr. 8, 2019, (14 pages).
Luo, Zixin , et al. , "ContextDesc: Local Descriptor Augmentation With Cross-Modality Context", 2019 IEEE/CVF Conference on Computer Vision and Pattern Recognition (CVPR), IEEE, XP033686823, DOI: 10.1109/CVPR.2019.00263 [retrieved on Jan. 8, 2020], pp. 2522-2531.
Memon, F. , et al. , "Synthesis, Characterization and Optical Constants of Silicon Oxycarbide", EPJ Web of Conferences; Publication [online]. Mar. 23, 2017 [retrieved Feb. 19, 2020).<URL: https://www.epj-conferences.org/articles/epjconf/pdf/2017/08/epjconf_nanop2017 _00002.pdf>; DOI: 10.1051/epjconf/201713900002, (8 pages).
Molchanov, Pavlo , et al. , "Short-range FMCW monopulse radar for hand-gesture sensing", 2015 IEEE Radar Conference (RadarCon) (2015), pp. 1491-1496.
Mrad , et al. , "A framework for System Level Low Power Design Space Exploration", 1991.
Munkres, James, "Algorithms for the assignment and transportation problems", Journal of the Society for Industrial and Applied Mathematics, 5(1): 1957, pp. 32-38.
Ono, Yuki , et al. , "LF-Net: Learning local features from images", 32nd Conference on Neural Information Processing Systems (NIPS 2018), arXiv:1805.09662v2 [cs.CV] Nov. 22, 2018, (13 pages).
Paszke, Adam , et al. , "Automatic differentiation in Pytorch", 31st Conference on Neural Information Processing Systems (NIPS 2017), Long Beach, CA, USA, (4 pages).
Peyré, Gabriel , et al. , "Computational Optimal Transport", Foundations and Trends in Machine Learning, 11(5-6):355-607, 2019; arXiv:1803.00567v4 [stat.ML] Mar. 18, 2020, (209 pages).
Qi, Charles Ruizhongtai, et al. , "Pointnet++: Deep hierarchical feature learning on point sets in a metric space.", 31st Conference on Neural Information Processing Systems (NIPS 2017), Long Beach, CA, USA., Jun. 7, 2017, (10 pages).
Qi, Charles R , et al. , "Pointnet: Deep Learning on Point Sets for 3D Classification and Segmentation", CVPR, arXiv:1612.00593v2 [cs.CV] Apr. 10, 2017, (19 pages).
Radenović, Filip , et al. , "Revisiting Oxford and Paris: Large-Scale Image Retrieval Benchmarking", CVPR, arXiv:1803.11285v1 [cs.CV] Mar. 29, 2018, (10 pages).
Raguram, Rahul , et al. , "A comparative analysis of ransac techniques leading to adaptive real-time random sample consensus", Computer Vision—ECCV 2008, 10th European Conference on Computer Vision, Marseille, France, Oct. 12-18, 2008, Proceedings, Part I, (15 pages).
Ranftl, René , et al. , "Deep fundamental matrix estimation", European Conference on Computer Vision (ECCV), 2018, (17 pages).
Revaud, Jerome , et al. , "R2D2: Repeatable and Reliable Detector and Descriptor", In NeurIPS, arXiv:1906.06195v2 [cs.CV] Jun. 17, 2019, (12 pages).
Rocco, Ignacio , et al. , "Neighbourhood Consensus Networks", 32nd Conference on Neural Information Processing Systems (NeurIPS 2018), Montreal, Canada, arXiv:1810.10510v2 [cs.CV] Nov. 29, 2018, (20 pages).
Rublee, Ethan , et al. , "ORB: An efficient alternative to SIFT or SURF", Proceedings of the IEEE International Conference on Computer Vision. 2564-2571. 2011; 10.1109/ICCV.2011.612654, (9 pages).
Sarlin , et al. , "SuperGlue: Learning Feature Matching with Graph Neural Networks", Cornell University Library/Computer Science/Computer Vision and Pattern Recognition, Nov. 26, 2019 [retrieved on Jan. 8, 2021 from the Internet< URL: https://arxiv.org/abs/1911.11763 >, entire document.
Sattler, Torsten , et al. , "SCRAMSAC: Improving RANSAC's efficiency with a spatial consistency filter", ICCV, 2009: 2090-2097., (8 pages).
Schonberger, Johannes Lutz, et al. , "Pixelwise view selection for un-structured multi-view stereo, Computer Vision—ECCV 2016:

(56) References Cited

OTHER PUBLICATIONS

14th European Conference, Amsterdam, The Netherlands, Oct. 11-14, 2016, Proceedings, Part III", pp. 501-518, 2016.
Schonberger, Johannes Lutz, et al. , "Structure-from-motion revisited", Proceedings of the IEEE Conference on Computer Vision and Pattern Recognition (CVPR), 2016, pp. 4104-4113, (11 pages).
Sheng, Liu , et al. , "Time-multiplexed dual-focal plane head-mounted display with a liquid lens", Optics Letters, Optical Society of Amer i ca, US, vol. 34, No. 11, Jun. 1, 2009 (Jun. 1, 2009), XP001524475, ISSN: 0146-9592, pp. 1642-1644.
Sinkhorn, Richard , et al. , "Concerning nonnegative matrices and doubly stochastic matrices.", Pacific Journal of Mathematics, 1967, pp. 343-348.
Spencer, T. , et al. , "Decomposition of poly(propylene carbonate) with UV sensitive iodonium 11 salts", Polymer Degradation and Stability; (online]. Dec. 24, 2010 (retrieved Feb. 19, 2020]., (17 pages).
Tanriverdi, Vildan , et al. , "Interacting With Eye Movements in Virtual Environments", Department of Electrical Engineering and Computer Science, Tufts University; Proceedings of the SIGCHI conference on Human Factors in Computing Systems, Apr. 2000, pp. 1-8.
Thomee, Bart , et al. , "YFCC100m: The new data in multimedia research", Communications of the ACM, 59(2):64-73, 2016; arXiv:1503.01817v2 [cs.MM] Apr. 25, 2016, (8 pages).
Torresani, Lorenzo , et al. , "Feature correspondence via graph matching: Models and global optimization", Computer Vision—ECCV 2008, 10th European Conference on Computer Vision, Marseille, France, Oct. 12-18, 2008, Proceedings, Part II, (15 pages).
Tuytelaars, Tinne , et al. , "Wide baseline stereo matching based on local, affinely invariant regions", BMVC, 2000, pp. 1-14.
Ulyanov, Dmitry , et al. , "Instance normalization: The missing ingredient for fast stylization", arXiv:1607.08022v3 [cs.CV] Nov. 6, 2017, (6 pages).
Vaswani, Ashish , et al. , "Attention is all you need", 31st Conference on Neural Information Processing Systems (NIPS 2017), Long Beach, CA, USA; arXiv:1706.03762v5 [cs.CL] Dec. 6, 2017, (15 pages).
Veličković, Petar , et al. , "Graph attention networks", ICLR, arXiv:1710.10903v3 [stat.ML] Feb. 4, 2018, (12 pages).
Villani, Cédric, "Optimal transport: old and new", vol. 338. Springer Science & Business Media, Jun. 2008, pp. 1-998.
Wang, Xiaolong , et al. , "Non-local neural networks", CVPR, arXiv:1711.07971v3 [cs.CV] Apr. 13, 2018, (10 pages).
Wang, Yue , et al. , "Deep Closest Point: Learning representations for point cloud registration", ICCV, arXiv:1905.03304v1 [cs.CV] May 8, 2019, (10 pages).
Wang, Yue , et al. , "Dynamic Graph CNN for learning on point clouds", ACM Transactions on Graphics, arXiv:1801.07829v2 [cs.CV] Jun. 11, 2019, (13 pages).
Weissel , et al. , "Process cruise control: event-driven clock scaling for dynamic power management", Proceedings of the 2002 international conference on Compilers, architecture, and synthesis for embedded systems. Oct. 11, 2002 (Oct. 11, 2002) Retrieved on May 16, 2020 (May 16, 2020) from <URL: https://dl.acm.org/doi/pdf/10.1145/581630.581668>.
Yi, Kwang Moo, et al. , "Learning to find good correspondences", CVPR, arXiv:1711.05971v2 [cs.CV] May 21, 2018, (13 pages).
Yi, Kwang Moo , et al. , "Lift: Learned invariant feature transform", ECCV, arXiv:1603.09114v2 [cs.CV] Jul. 29, 2016, (16 pages).
Zaheer, Manzil , et al. , "Deep Sets", 31st Conference on Neural Information Processing Systems (NIPS 2017), Long Beach, CA, USA; arXiv:1703.06114v3 [cs.LG] Apr. 14, 2018, (29 pages).
Zhang, Jiahui , et al. , "Learning two-view correspondences and geometry using order-aware network", ICCV; aarXiv:1908.04964v1 [cs.CV] Aug. 14, 2019, (11 pages).
Zhang, Li , et al. , "Dual graph convolutional net-work for semantic segmentation", BMVC, 2019; arXiv:1909.06121v3 [cs.CV] Aug. 26, 2020, (18 pages).
Zhang, Zen , et al. , "Deep Graphical Feature Learning for the Feature Matching Problem", 2019 IEEE/CVF International Conference on Computer Vision (ICCV), IEEE, XP033723985, DOI: 10.1109/ICCV.2019.00519 [retrieved on Feb. 24, 2020], pp. 5086-5095.
"Communication Pursuant to Article 94(3) EPC mailed Nov. 28, 2024", European Patent Application No. 19885958.9, (5 pages).
"Communication Pursuant to Article 94(3) EPC mailed on Feb. 21, 2024", European Patent Application No. 20770244.0, (8 pages).
"Communication Pursuant to Article 94(3) EPC mailed on Feb. 7, 2025", European Patent Application No. 20154070.5, (7 pages).
"Communication Pursuant to Article 94(3) EPC mailed on Mar. 11, 2024", European Patent Application No. 20798769.4, (12 pages).
"Communication Pursuant to Article 94(3) EPC mailed on Mar. 18, 2025", European Patent Application No. 19810142.0, (8 pages).
"Communication Pursuant to Article 94(3) EPC mailed on Nov. 21, 2024", European Patent Application No. 20846338.0, (11 pages).
"Communication Pursuant to Article 94(3) EPC mailed on Oct. 6, 2023", European Patent Application No. 19851373.1, (6 pages).
"Extended European Search Report issued on Jan. 8, 2024", European Patent Application No. 23195266.4, (8 pages).
"Extended European Search Report issued on Apr. 25, 2024", European Patent Application No. 23208907.8, (9 pages).
"Extended European Search Report issued on Aug. 6, 2024", European Patent Application No. 24184599.9, (14 pages).
"Extended European Search Report issued on Dec. 2, 2024", European Patent Application No. 24167829.1, (7 pages).
"Extended European Search Report issued on Jul. 9, 2024", European Patent Application No. 24166847.4, (8 pages).
"Final Office Action mailed Oct. 16, 2023", U.S. Appl. No. 17/098,043, (7 pages).
"Final Office Action mailed on Aug. 15, 2024 with English translation", Japanese Patent Application No. 2021-553297, (5 pages).
"Final Office Action mailed on Dec. 1, 2023", U.S. Appl. No. 17/357,795, (18 pages).
"Final Office Action mailed on Dec. 13, 2024 with English translation", Japanese Patent Application No. 2021-564496, (13 pages).
"Final Office Action mailed on May 24, 2024", U.S. Appl. No. 18/046,739, (52 pages).
"Final Office Action mailed on Sep. 8, 2023 with English translation", Japanese Patent Application No. 2020-566620, (18 pages).
"First Office Action mailed Apr. 22, 2025 with English translation", Chinese Patent Application No. 202211347201.X, (11 pages).
"First Office Action mailed Dec. 12, 2023 with English translation", Japanese Patent Application No. 2021-545712, (8 pages).
"First Office Action mailed Dec. 20, 2023 with English translation", Chinese Patent Application No. 201980050600.X, (21 pages).
"First Office Action mailed Jun. 20, 2024 with English translation", Japanese Patent Application No. 2021-564496, (14 pages).
"First Office Action mailed Jun. 24, 2024 with English translation", Japanese Patent Application No. 2022-504602, (7 pages).
"First Office Action mailed Mar. 1, 2024 with English translation", Japanese Patent Application No. 2021-553297, (5 pages).
"First Office Action mailed Mar. 20, 2024 with English translation", Chinese Patent Application No. 202080048293.4, (22 pages).
"First Office Action mailed Nov. 2, 2023 with English translation", Chinese Patent Application No. 201980090867.1, (16 pages).
"First Office Action mailed Oct. 17, 2024 with English translation", Japanese Patent Application No. 2022-527990, (24 pages).
"First Office Action mailed on Dec. 11, 2023 with translation", Chinese Patent Application No. 201980032005.3, (17 pages).
"First Office Action mailed on Dec. 25, 2023 with English translation", Chinese Patent Application No. 2019800046303.8, (13 pages).
"First Office Action mailed on Feb. 1, 2024 with English translation", Chinese Patent Application No. 202080018865.4, (9 pages).
"First Office Action mailed on Mar. 25, 2024 with English translation", Chinese Patent Application No. 202080018919.7, (31 pages).
"First Office Action mailed Sep. 29, 2023 with English translation", Japanese Patent Application No. 2023-10887, (5 pages).
"First Office Action with English translation dated Aug. 8, 2024", Chinese Patent Application No. 202080053774.4, (23 pages).

(56) References Cited

OTHER PUBLICATIONS

"Non Final Office Action mailed on Apr. 16, 2025", U.S. Appl. No. 18/679,328, (10 pages).
"Non Final Office Action mailed on Feb. 26, 2024", U.S. Appl. No. 18/046,739, (48 pages).
"Non Final Office Action mailed on Jan. 3, 2025", U.S. Appl. No. 18/746,709, (31 pages).
"Non Final Office Action mailed on Jun. 17, 2024", U.S. Appl. No. 18/348,732, (19 pages).
"Non Final Office Action mailed on Jun. 17, 2025", U.S. Appl. No. 18/674,016, (7 pages).
"Non Final Office Action mailed on May 16, 2024", U.S. Appl. No. 18/361,546, (11 pages).
"Non Final Office Action mailed on Nov. 3, 2023", U.S. Appl. No. 17/416,248, (17 pages).
"Non Final Office Action mailed on Oct. 11, 2023", U.S. Appl. No. 18/151,763, (14 pages).
"Non Final Office Action mailed on Oct. 24, 2023", U.S. Appl. No. 17/259,020, (21 pages).
"Non Final Office Action mailed on Sep. 24, 2024", U.S. Appl. No. 18/597,716, (9 pages).
"Notice of Reasons for Rejection mailed on Dec. 4, 2024 with English tranlsation", Japanese Patent Application No. 2023-118968, (9 pages).
"Office Action mailed Feb. 20, 2025 with English translation", Japanese Patent Application No. 2024-135314, (6 pages).
"Office Action mailed Nov. 21, 2023 with English Translation", Japanese Patent Application No. 2021-535716, (15 pages).
"Office Action mailed on Apr. 16, 2025 with English Translation", Japanese Patent Application No. 2024-139589, (8 pages).
"Office Action mailed on Apr. 16, 2025 with English Translation", Japanese Patent Application No. 2022-527990, (9 pages).
"Office Action mailed on Dec. 14, 2023 with English translation", Japanese Patent Application No. 2021-526564, (13 pages).
"Office Action mailed on Feb. 19, 2024 with English translation", Korean Patent Application No. 10-2020-7020552, (18 pages).
"Office Action mailed on Feb. 26, 2024 with English translation", Chinese Patent Application No. 201980069194.1, (11 pages).
"Office Action mailed on Jan. 22, 2025 with English translation", Japanese Patent Application No. 2024-63271, (8 pages).
"Office Action mailed on Mar. 17, 2025 with English Translation", Japanese Patent Application No. 2023-221068, (9 pages).
"Office Action mailed on Mar. 6, 2024 with English translation", Chinese Patent Application No. 201980053016.X, (7 pages).
"Office Action mailed on Nov. 7, 2023 with English translation", Korean Patent Application No. 10-2023-7036734, (5 pages).
"Office Action mailed on Nov. 7, 2024 with English translation", Korean Patent Application No. 10-2024-7032937, (7 pages).
"Office Action mailed on Nov. 8, 2023 with English translation", Chinese Patent Application No. 201980060018.1, (12 pages).
"Office Action mailed on Oct. 4, 2024 with English translation", Japanese Patent Application No. 2022-527710, (10 pages).
"Penultimate Office Action mailed on Apr. 9, 2024—English translation", Japanese Patent Application No. 2021-535716, (5 pages).
"Penultimate Office Action mailed on Oct. 19, 2023 with English translation", Japanese Patent Application No. 2021-509779, (5 pages).
"Penultimate Office Action mailed on Sep. 17, 2024 with English translation", Japanese Patent Application No. 2023-115047, (7 pages).
"Second Office Action mailed on Sep. 25, 2023 with English translation", Japanese Patent Application No. 2020-567853, (8 pages).
"Second Office Action with English translation mailed on Jul. 2, 2024", Chinese Patent Application No. 201980032005.3, (15 pages).
"Second Office Action with English translation mailed on Mar. 25, 2025", Chinese Patent Application No. 202080053774.4, (11 pages).
"Final Office Action mailed on Dec. 17, 2025", U.S. Appl. No. 18/674,016, (8 pages).
"First Office Action mailed Dec. 20, 2025 with English translation", Chinese Patent Application No. 202080079114.3, (10 pages).
"Non Final Office Action mailed on Feb. 3, 2026", U.S. Appl. No. 18/643,757, (14 pages).
"Second Office Action with English translation mailed on Feb. 24, 2026", Chinese Patent Application No. 202080079136.X, (52 pages).
"First Office Action mailed Mar. 11, 2026 with English translation", Japanese Patent Application No. 2025-94021, (10 pages).
"Office Action mailed on Mar. 17, 2026 with English translation", Japanese Patent Application No. 2025-087496, (14 pages).
"Office Action mailed on Dec. 31, 2025 with English translation", Chinese Patent Application No. 202310982588.4, (5 pages).
"Office Action mailed on Apr. 13, 2026", Korean Patent Application No. 10-2025-7029784, 11 pages).
"Office Action mailed on Apr. 20, 2026 with English translation", Japanese Patent Application No. 2025-84148, (4 pages).
"Second Office Action mailed on May 22, 2026 with English translation", Chinese Patent Application No. 202310982588.4, (10 pages).
"Office Action mailed on Apr. 20, 2026 with English translaiton", Chinese patent application No. 202310782989.5, (10 pages).
"Second Office Action with English translation mailed on May 29, 2026", Chinese Patent Application No. 202080079114.3, (5 pages).
"Notice of Allowance and Examiner-Initiated Interview Summary mailed on Jun. 23, 2026", U.S. Appl. No. 18/830,108, (12 pages).
"Office Action mailed on Jun. 9, 2026 with English translation", Japanese Patent Application No. 2025-64906, (10 pages).
"Office Action mailed May 27, 2026 with English translation", Chinese Patent Application No. 202311084864.1, (12 pages).
Leydon, Krispin, "Sensing the Position & Orientation of Hand-Held Objects: An Overview of Techniques", UL-CSIS-03-02 IDC Dec 3, 2001 (Year: 2001), (15 pages).
Wang, et al., "Learning Combinatorial Embedding Networks for Deep Graph Matching", Proceedings of the IEEE/CVF International Conference on Computer Vision (ICCV), 2019, pp. 3056-3065.
Yin, et al., "Design of Six Degrees of Freedom Electromagnetic Tracker for Virtual Reality System", 2012 IEEE International Conference on Virtual Environments Human-Computer Interfaces and Measurement Systems (VECIMS) Proceedings (Year: 2012), (4 pages).

* cited by examiner

POLYCHROMATIC LIGHT OUT-COUPLING APPARATUS, NEAR-EYE DISPLAYS COMPRISING THE SAME, AND METHOD OF OUT-COUPLING POLYCHROMATIC LIGHT

CROSS-REFERENCE TO RELATED APPLICATIONS

This is a continuation of U.S. patent application Ser. No. 17/516,483, filed on Nov. 1, 2021, which is a continuation of U.S. patent application Ser. No. 16/698,588, filed on Nov. 27, 2019 now U.S. Pat. No. 11,199,713, which is a continuation of U.S. patent application Ser. No. 15/843,258, filed on Dec. 15, 2017 now U.S. Pat. No. 10,527,853, which claims priority from European Patent Application No. 16207441.3, filed on Dec. 30, 2016, each of which is incorporated herein by reference in their entirety.

TECHNOLOGICAL FIELD

Embodiments of the present invention relate to a polychromatic light out-coupling apparatus, near-eye displays comprising the same, and a method of out-coupling polychromatic light. In particular, they relate to monocular and binocular near-eye displays comprising such a polychromatic light out-coupling apparatus providing a wide field of view, and to a method of using the same to view a pattern of polychromatic light, such as a colour image or a colour video image sequence.

BACKGROUND

FIGS. 1A and 1B schematically show light 5 entering from the left into a diffractive optical element comprising a diffractive layer 11 having a repeated diffraction spacing, d. The light 5 is transmitted through the interior of the diffractive optical element 10 by total internal reflection and is diffracted by the diffractive layer 11. When diffracted, some of the light 5 is out-coupled from the diffractive optical element 10, as represented by arrows 15. The angles $\theta_n$ of the out-coupled light for each diffracted order n are determined by the wavelength of the light source and the repeated diffraction spacing d of the diffractive layer 11 according to the well-known equation:

$$d(\sin\theta_n+\sin\theta_i)=n\lambda \quad \text{[Eqn. 1]}$$

where $\theta_i$ is the angle of incident light, n is an integer, $\theta_n$ is the angle of the diffracted light and $\lambda$ is the wavelength of the light. As shown in FIG. 1A, incoming light 5 entering the diffractive optical element 10 at smaller angles generally travels a lesser distance by each total internal reflection before being out-coupled by diffraction, so that the out-coupled light 15 is mostly concentrated near to where the light has entered the diffractive optical element 10, fading out rapidly from left to right. On the other hand, as shown in FIG. 1B, incoming light 5 entering the diffractive optical element 10 at larger angles can travel a greater distance by each total internal reflection before being out-coupled by diffraction, so that the out-coupled light 15 is mostly concentrated far from where the light has entered the diffractive optical element 10. Similar considerations would apply in a left-right mirror image if the incoming light 5 were instead to enter the diffractive optical element 10 from the right in FIGS. 1A and 1B, rather than from the left.

FIG. 1C schematically shows a pair of such out-coupling diffractive optical elements 10L, 10R, each of which comprises a respective diffractive layer 11L, 11R. The out-coupling diffractive optical elements 10L, 10R are arranged in optical communication with an in-coupling diffractive optical element 30 comprising a similar diffractive layer 31 to that of the out-coupling diffractive optical elements 10L, 10R and having the same repeated diffraction spacing d. The in-coupling diffractive optical element 30 receives incoming light 5, which is diffracted by diffractive layer 31 and transmitted by total internal reflection to the out-coupling diffractive optical elements 10L, 10R.

FIG. 1C also schematically shows eyeballs 81, 82 of a viewer gazing at the out-coupling diffractive optical elements 10L, 10R. As may be understood from FIG. 1A, for a viewer looking to the right, as shown in FIG. 1C, the out-coupled light 15 will therefore have lowered brightness in the region A, whereas light in the region B will fall outside the gaze of the viewer and be wasted. On the other hand, as may also be understood from FIG. 1B, for a viewer looking to the left, the out-coupled light 15 will similarly have lowered brightness in the region B and will fall outside the gaze of the viewer in region A and be wasted.

FIG. 2A schematically shows a pair of components 1, 2 of an apparatus for out-coupling polychromatic light, for use, for example, in a binocular near-eye display. By polychromatic light is meant light of at least two different wavelengths. The components 1, 2 each have left and right halves which are mirror images of each other, configured to out-couple light to a pair of eyes. Component 1 therefore comprises a pair of out-coupling diffractive optical elements 10L, 10R, a pair of corresponding in-coupling diffractive optical elements 30L, 30R, and a pair of intermediate optical elements 51, 52, which respectively direct light from the in-coupling diffractive optical element 30L to the out-coupling diffractive optical element 10L and from the in-coupling diffractive optical element 30R to the out-coupling diffractive optical element 10R. Component 2 similarly comprises a pair of out-coupling diffractive optical elements 20L, 20R, a pair of corresponding in-coupling diffractive optical elements 40L, 40R, and a pair of intermediate optical elements 53, 54, which respectively direct light from the in-coupling diffractive optical element 40L to the out-coupling diffractive optical element 20L and from the in-coupling diffractive optical element 40R to the out-coupling diffractive optical element 20R.

Components 1 and 2 differ from each other in that the in- and out-coupling diffractive optical elements 30L, 30R, 10L, 10R of component 1 have a first repeated diffraction spacing, $d_1$, whereas the in- and out-coupling diffractive optical elements 40L, 40R, 20L, 20R of component 2 have a second repeated diffraction spacing, $d_2$, which is different from the first spacing, $d_1$. Components 1 and 2 can therefore provide respective channels of optimized efficiency for diffracting light in two different wavelength bands. For example, component 1 may provide a channel for red light and component 2 may provide a channel for green-blue light. Thus if components 1 and 2 are superposed one on top of the other, as is schematically represented in FIG. 2B, and if the optical elements of each component are carefully aligned, polychromatic light from a single display can be projected into the in-coupling diffractive optical elements 30L, 30R, 40L, 40R. Light in two different wavelength bands will then be out-coupled from elements 10L and 20L and will re-combine to provide polychromatic light to a viewer's left eye, whilst light in two different wavelength bands will also be out-coupled from elements 10R and 20R and re-combine to provide polychromatic light to the viewer's right eye. A similar arrangement can be used in a monocular near-eye display to out-couple polychromatic light to a single eye by using only a left or right half of each of the components 1 and 2.

The components 1, 2 may each be understood as being similar in construction and function to the in- and out-coupling diffractive optical elements described above in relation to FIG. 1C. Therefore, they suffer from the same problems as were explained above in relation to FIG. 1C. Typically, for example, if the components 1, 2 are incorporated into a binocular near-eye display, they will provide a field of view of less than about 40 degrees. The "eye box" can be increased by scaling the size of all of the optical elements, starting with the display, but this is undesirable, from the point of view not only of cost, but also of wearability. On the other hand, a much wider field of view would be highly desirable, considering that the natural field of view of a healthy human can extend beyond 180 degrees in the horizontal direction.

BRIEF SUMMARY

According to various, but not necessarily all, embodiments of the invention there is provided an apparatus comprising a first out-coupling diffractive optical element and a second out-coupling diffractive optical element. Each of the first and second out-coupling diffractive optical elements comprises a first region having a first repeated diffraction spacing, $d_1$, and a second region adjacent to the first region having a second repeated diffraction spacing, $d_2$, different from the first spacing, $d_1$. The first region of the first out-coupling diffractive optical element is superposed on and aligned with the second region of the second out-coupling diffractive optical element. The second region of the first out-coupling diffractive optical element is superposed on and aligned with the first region of the second out-coupling diffractive optical element.

With such an apparatus, light of two different wavelengths from two different respective in-coupling diffractive optical elements can be directed into one and the same out-coupling diffractive optical element from different locations and/or directions for viewing by a single eye. Light of one of the two wavelengths is out-coupled from the first region of the out-coupling diffractive optical element, whereas light of the other of the two wavelengths is out-coupled from the second region of the same out-coupling diffractive optical element. Thus if two such out-coupling diffractive optical elements are superposed one on top of the other, with the first region of the first out-coupling diffractive optical element carefully aligned with the second region of the second out-coupling diffractive optical element, and with the second region of the first out-coupling diffractive optical element carefully aligned with the first region of the second out-coupling diffractive optical element, a viewer can see polychromatic light in a field of view which is much wider than from an arrangement such as shown and described above in relation to FIGS. 2A and 2B. The resulting technical effect may also be understood as allowing polychromatic light to be coupled into the two superposed out-coupling diffractive optical elements from two different locations and/or directions, for example from opposing directions. Thus regardless of whether the viewer is looking to the left or to the right, they will always be able to view polychromatic light which has not travelled far through the two out-coupling diffractive optical elements by total internal reflection from a respective one of the in-coupling diffractive optical elements before the light is out-coupled by diffraction from the corresponding region of one of the two out-coupling diffractive optical elements. The out-coupled light is therefore less subject to fade-out or vignetting at viewing angles which are much wider than conventionally. In principle, all other things being equal, the field of view could be doubled in comparison to a conventional arrangement, although the actual field of view can be optimized according to ergonomic requirements and other design considerations.

Preferably, the first and second out-coupling diffractive optical elements are both substantially rectangular and have a pair of long edges and a pair of short edges, and a division between the first region and the second region of the first and second out-coupling diffractive optical elements is located substantially equidistant between the pair of short edges. Thus, according to such an embodiment, the eye of a viewer of the first and second out-coupling diffractive optical elements may be positioned substantially perpendicular to the division, for equal viewing of the first and second regions.

The length of the long edges of the first and second out-coupling diffractive optical elements may be different between different embodiments, but the division between the first region and the second region should nonetheless be maintained substantially equidistant from each of the pair of short edges between the different embodiments.

Any of the diffractive optical elements may, for example, be a hologram, such as a volume hologram, or a diffraction grating, such as a surface relief diffraction grating. By "repeated diffraction spacing" is meant the separation between repeated diffractive features of a diffractive optical element. The repeated diffractive features may be oriented parallel to each other in any preferred direction. For example, if the diffractive optical elements are to be incorporated into a near-eye display, the repeated diffractive features may preferably be oriented such that in use of the near-eye display, they will be substantially parallel to either a vertical or a horizontal axis of the display.

If the first and second out-coupling diffractive optical elements are both diffraction gratings, the first region of each grating may comprise rulings of the first spacing, $d_1$, and the second region of each grating may comprise rulings of the second spacing, $d_2$. Preferably, the rulings of the first region of each grating are substantially parallel to the rulings of the second region of the same grating. This has the advantage of allowing for easy manufacture of each of the first and second out-coupling diffractive optical elements by ruling them in a single manufacturing operation. In an alternative preferred embodiment, the rulings of the first region of each grating may instead be substantially perpendicular to the rulings of the second region of the same grating. This has the advantage of allowing light to be directed into each grating region from directions which are perpendicular to each other, giving greater design freedom to adapt to ergonomic requirements.

Preferably, the apparatus further comprises a first pair of in-coupling diffractive optical elements having the first repeated diffraction spacing, d1, which are configured to direct light to the first region of respective ones of the first and second out-coupling diffractive optical elements, and a second pair of in-coupling diffractive optical elements having the second repeated diffraction spacing, d2, which are configured to direct light to the second region of respective ones of the first and second out-coupling diffractive optical elements.

If so, the apparatus preferably also comprises at least one intermediate optical element configured to transmit light from a respective one of the in-coupling diffractive optical elements to a region of a respective one of the out-coupling diffractive optical elements having the same spacing as the respective one of the in-coupling diffractive optical elements. Such an intermediate optical element may be positioned along one of the long edges or along one of the short edges of the respective one of the out-coupling diffractive optical elements, according to the orientation, relative to the short or long edge, of the repeated diffractive features of said region having the same spacing as the respective one of the in-coupling diffractive optical elements. For example, if the repeated diffractive features of the region are parallel to the long edge of the out-coupling diffractive optical element, then the intermediate optical element may be positioned along the long edge as well. On the other hand, if the repeated diffractive features of the region are parallel to the short edge of the out-coupling diffractive optical element, then the intermediate optical element may be positioned along the short edge instead. There may be other configurations, depending on the desired form factor of the device to be manufactured.

The at least one intermediate optical element may comprise at least one of a diffractive optical element, such as a hologram or diffraction grating, and a reflective optical element, such as a mirror or prism. The at least one intermediate optical element may be configured as a waveguide for light from a respective one of the in-coupling diffractive optical elements to a region of a respective one of the out-coupling diffractive optical elements having the same spacing as the respective one of the in-coupling diffractive optical elements. Alternatively or additionally, the at least one intermediate optical element may be configured as a beam expander to expand light from a respective one of the in-coupling diffractive optical elements to a region of a respective one of the out-coupling diffractive optical elements having the same spacing as the respective one of the in-coupling diffractive optical elements.

According to various, but not necessarily all, embodiments of the invention there is also provided a monocular near-eye display comprising an apparatus as described above, a first optical projection engine and a second optical projection engine. The first optical projection engine is configured to project polychromatic light into the first and second in-coupling diffractive optical elements which are respectively configured to direct light to the first region of the first out-coupling diffractive optical element and to the second region of the second out-coupling diffractive optical element. The second optical projection engine is configured to project polychromatic light into the first and second in-coupling diffractive optical elements which are respectively configured to direct light to the first region of the second out-coupling diffractive optical element and to the second region of the first out-coupling diffractive optical element.

Any of the optical projection engines may typically comprise, for example, a display, such as a microdisplay, and a collimator.

According to various, but not necessarily all, embodiments of the invention there is also provided a binocular near-eye display comprising two apparatuses as described above, a first optical projection engine, a second optical projection engine and at least one additional optical projection engine. The first optical projection engine is configured to project polychromatic light into the first and second in-coupling diffractive optical elements which are respectively configured to direct light to the first region of the first out-coupling diffractive optical element and to the second region of the second out-coupling diffractive optical element of a first one of the two apparatuses. The second optical projection engine is configured to project polychromatic light into the first and second in-coupling diffractive optical elements which are respectively configured to direct light to the first region of the first out-coupling diffractive optical element and to the second region of the second out-coupling diffractive optical element of a second one of the two apparatuses. The at least one additional optical projection engine is configured to project polychromatic light into the first and second in-coupling diffractive optical elements which are respectively configured to direct light to the first region of the second out-coupling diffractive optical element and to the second region of the first out-coupling diffractive optical element of at least one of the two apparatuses.

Any of the optical projection engines may typically comprise, for example, a display, such as a microdisplay, and a collimator.

Preferably, each of the two apparatuses of the binocular near-eye display has a respective midpoint, and a separation between the midpoints of the two apparatuses is adjustable, to accommodate different interpupillary distances of different users.

Preferably, the at least one additional optical projection engine comprises a third optical projection engine and a fourth optical projection engine. The third optical projection engine is configured to project polychromatic light into the first and second in-coupling diffractive optical elements which are respectively configured to direct light to the first region of the second out-coupling diffractive optical element and to the second region of the first out-coupling diffractive optical element of the first one of the two apparatuses. The fourth optical projection engine is configured to project polychromatic light into the first and second in-coupling diffractive optical elements which are respectively configured to direct light to the first region of the second out-coupling diffractive optical element and to the second region of the first out-coupling diffractive optical element of the second one of the two apparatuses.

In an alternative possible preferred embodiment, the at least one additional optical projection engine is instead configured to project polychromatic light by temporal or spatial interlacing into the first and second in-coupling diffractive optical elements which are respectively configured to direct light to the first region of the second out-coupling diffractive optical element and to the second region of the first out-coupling diffractive optical element of both of the two apparatuses. Thus, for example, the at least one additional optical projection engine may project alternate frames of a video image sequence into said first and second in-coupling diffractive optical elements by temporal interlacing, or the at least one additional optical projection engine may project alternate lines of each frame of a video image sequence into said first and second in-coupling diffractive optical elements by spatial interlacing.

According to various, but not necessarily all, embodiments of the invention there is further provided a method comprising: emitting a first pattern of light of a first wavelength from a first region of a first out-coupling diffractive optical element and a second pattern of light of a second wavelength from a second region of the first out-coupling diffractive optical element adjacent to the first region; emitting light of the first wavelength in the second pattern from a first region of a second out-coupling diffractive optical element and light of the second wavelength in the first pattern from a second region of the second out-coupling diffractive optical element adjacent to the first region; superposing and aligning the first patterns of light emitted from the first region of the first out-coupling diffractive optical element and from the second region of the second outcoupling diffractive optical element; and superposing and aligning the second patterns of light emitted from the second region of the first out-coupling diffractive optical element and from the first region of the second out-coupling diffractive optical element.

Preferably, the first and second patterns of light may typically be spatially continuous with each other, so that together they combine to form a single pattern, such as a single still image or a single frame of a video sequence.

Preferably, the method further comprises projecting polychromatic light with the first pattern into one of a first pair of in-coupling diffractive optical elements with a first repeated diffraction spacing corresponding to the first wavelength and into one of a second pair of in-coupling diffractive optical elements with a second repeated diffraction spacing corresponding to the second wavelength; projecting polychromatic light with the second pattern into the other of the first pair of in-coupling diffractive optical elements with the first repeated diffraction spacing and into the other of the second pair of in-coupling diffractive optical elements with the second repeated diffraction spacing; transmitting the first pattern of light from said one of the first pair of in-coupling diffractive optical elements to the first region of the first out-coupling diffractive optical element and from said one of the second pair of in-coupling diffractive optical elements to the second region of the second out-coupling diffractive optical element; and transmitting the second pattern of light from said other of the first pair of in-coupling diffractive optical elements to the first region of the second out-coupling diffractive optical element and from said other of the second pair of in-coupling diffractive optical elements to the second region of the first out-coupling diffractive optical element.

BRIEF DESCRIPTION

For a better understanding of various examples that are useful for understanding the detailed description, reference will now be made by way of example only to the accompanying drawings in which.

DETAILED DESCRIPTION

Figure 3A:
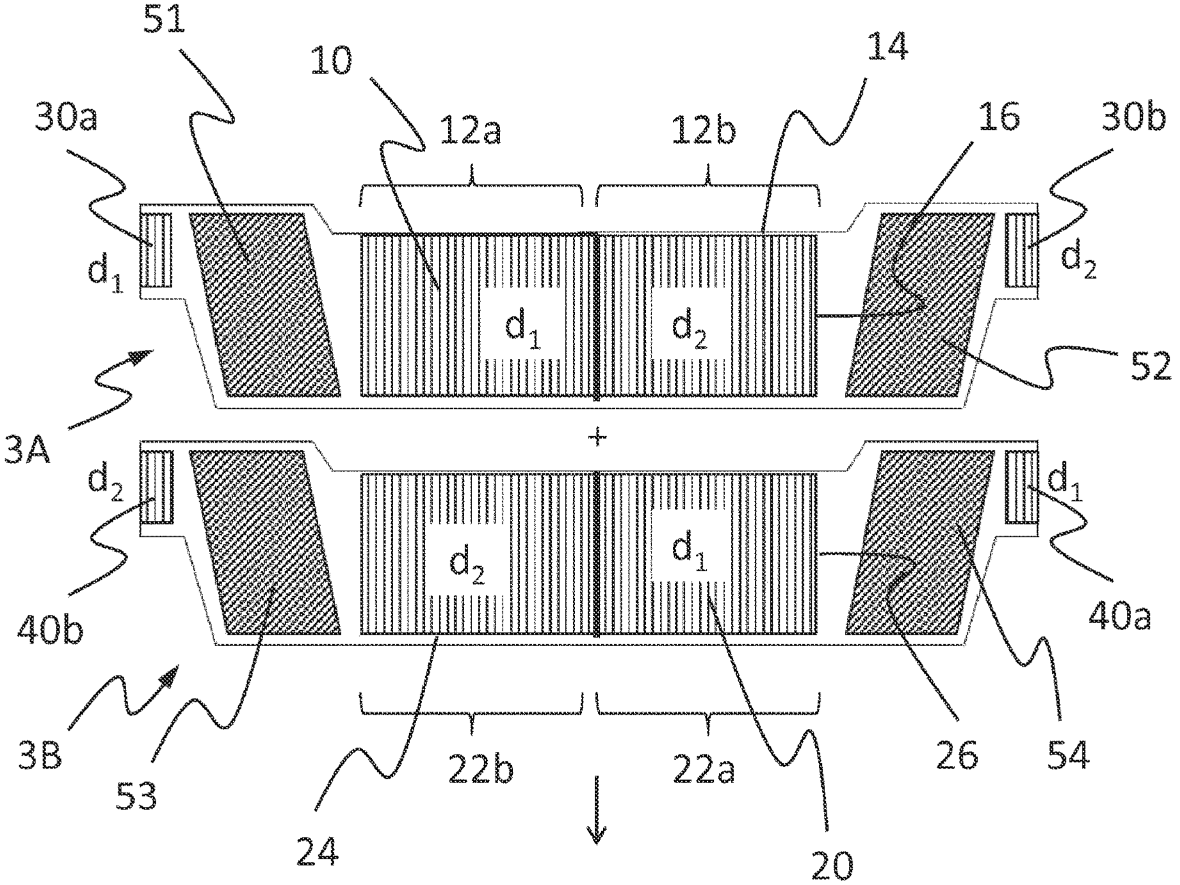
FIG. 3A is a schematic plan view of two components of a second apparatus for out-coupling polychromatic light.

FIG. 3A shows two components 3A, 3B of an apparatus 3 for out-coupling polychromatic light. The component 3A comprises a first out-coupling diffractive optical element 10, a first in-coupling diffractive optical element 30*a*, a second in-coupling diffractive optical element 30*b*, and two intermediate optical elements 51, 52. The first out-coupling diffractive optical element 10 comprises a first region 12*a* having a first repeated diffraction spacing, $d_1$, and a second region 12*b* adjacent to the first region 12*a* and having a second repeated diffraction spacing, $d_2$, which is different from the first spacing, $d_1$. The first in-coupling diffractive optical element 30*a* also has the first repeated diffraction spacing, $d_1$, and is configured to direct light to the first region 12*a*. The second in-coupling diffractive optical element 30*b* instead has the second repeated diffraction spacing, $d_2$, and is configured to direct light to the second region 12*b*. The two intermediate optical elements 51, 52 are respectively configured to transmit light from the first in-coupling diffractive optical element 30*a* to the first region 12*a* and from the second in-coupling diffractive optical element 30*b* to the second region 12*b*.

The component 3B comprises a second out-coupling diffractive optical element 20, another first in-coupling diffractive optical element 40*a*, another second in-coupling diffractive optical element 40*b*, and two further intermediate optical elements 53, 54. The second out-coupling diffractive optical element 20 comprises a first region 22*a* having the first repeated diffraction spacing, $d_1$, and a second region 22*b* adjacent to the first region 22*a* and having the second repeated diffraction spacing, $d_2$. The first in-coupling diffractive optical element 40*a* also has the first repeated diffraction spacing, $d_1$, and is configured to direct light to the first region 22*a*. The second in-coupling diffractive optical element 40*b* instead has the second repeated diffraction spacing, $d_2$, and is configured to direct light to the second region 22*b*. The two intermediate optical elements 53, 54 are respectively configured to transmit light from the first in-coupling diffractive optical element 40*a* to the first region 22*a* and from the second in-coupling diffractive optical element 40*b* to the second region 22*b*.

The first and second out-coupling diffractive optical elements 10, 20 are both substantially rectangular and have respective long edges 14, 24 and short edges 16, 26. A division between the first region 12*a*, 22*a* and the second region 12*b*, 22*b* of the first and second out-coupling diffractive optical elements 10, 20 is located substantially equidistant between the pair of short edges. In this embodiment, the first and second out-coupling diffractive optical elements 10, 20 are both diffraction gratings. The first region 12*a*, 22*a* of each grating comprises rulings of the first spacing, $d_1$, and the second region 12*b*, 22*b* of each grating comprises rulings of the second spacing, $d_2$. The rulings of the first region of each grating are substantially parallel to the rulings of the second region of the same grating and are aligned substantially parallel with the short edges 16, 26 of the out-coupling diffractive optical elements 10, 20. All of the intermediate optical elements 51, 52; 53, 54 are positioned along the short edges 16, 26 of the respective ones 10, 20 of the out-coupling diffractive optical elements.

Figure 3B:
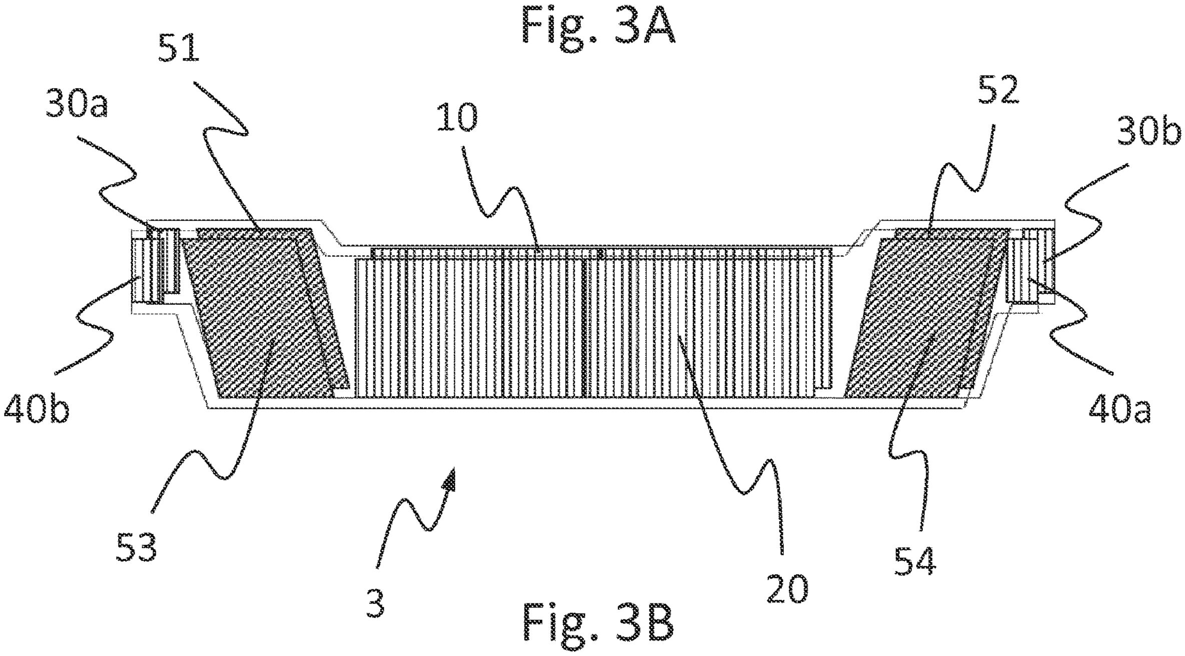
FIG. 3B is a schematic plan view of the two components of FIG. 3A superposed one on top of the other.

FIG. 3B shows the two components 3A, 3B of FIG. 3A superposed one on top of the other in apparatus 3. The first region 12*a* of the first out-coupling diffractive optical element 10 is carefully aligned with the second region 22*b* of the second out-coupling diffractive optical element 20, and the second region 12*b* of the first out-coupling diffractive optical element 10 is carefully aligned with the first region 22*a* of the second out-coupling diffractive optical element 20. Thus, if a first pattern of polychromatic light is projected into the left first and second in-coupling diffractive optical elements 30*a*, 40*b*, the first pattern of light of a first wavelength equal to the first spacing $d_1$ will be transmitted from the first in-coupling diffractive optical element 30*a* by the intermediate optical element 51 to the first region 12*a* of the first out-coupling diffractive optical element 10, and the first pattern of light of a second wavelength equal to the second spacing $d_2$ will be transmitted from the second in-coupling diffractive optical element 40*b* by the intermediate optical element 53 to the second region 22*b* of the second out-coupling diffractive optical element 20. Thereafter, the first pattern of light of the first wavelength will be emitted from the first region 12*a* of the first out-coupling diffractive optical element 10, and the first pattern of light of the second wavelength will be emitted from the second region 22*b* of the second out-coupling diffractive optical element 20. Due to the aforementioned careful alignment of the optical elements, the first pattern of light of the first wavelength emitted from the first region 12*a* and the first pattern of light of the second wavelength emitted from the second region 22*b* will therefore also be superposed and aligned with each other, and will recombine to recreate the first pattern of polychromatic light on a left-hand side of a combined field of view of the out-coupling diffractive optical elements 10, 20.

Meanwhile, if a second pattern of polychromatic light is projected into the right first and second in-coupling diffractive optical elements 40*a*, 30*b*, the second pattern of light of the first wavelength will be transmitted from the first in-coupling diffractive optical element 40*a* by the intermediate optical element 54 to the first region 22*a* of the second out-coupling diffractive optical element 20, and the second pattern of light of the second wavelength will be transmitted from the second in-coupling diffractive optical element 30*b* by the intermediate optical element 52 to the second region 12*b* of the first out-coupling diffractive optical element 10. Thereafter, the second pattern of light of the first wavelength will be emitted from the first region 22*a* of the second out-coupling diffractive optical element 20, and the second pattern of light of the second wavelength will be emitted from the second region 12*b* of the first out-coupling diffractive optical element 10. Once again, due to the aforementioned careful alignment of the optical elements, the second pattern of light of the first wavelength emitted from the first region 22*a* and the second pattern of light of the second wavelength emitted from the second region 12*b* will also be superposed and aligned with each other, and will recombine to recreate the second pattern of polychromatic light on a right-hand side of the combined field of view of the out-coupling diffractive optical elements 10, 20.

Figures 1A, 1B, 1C:
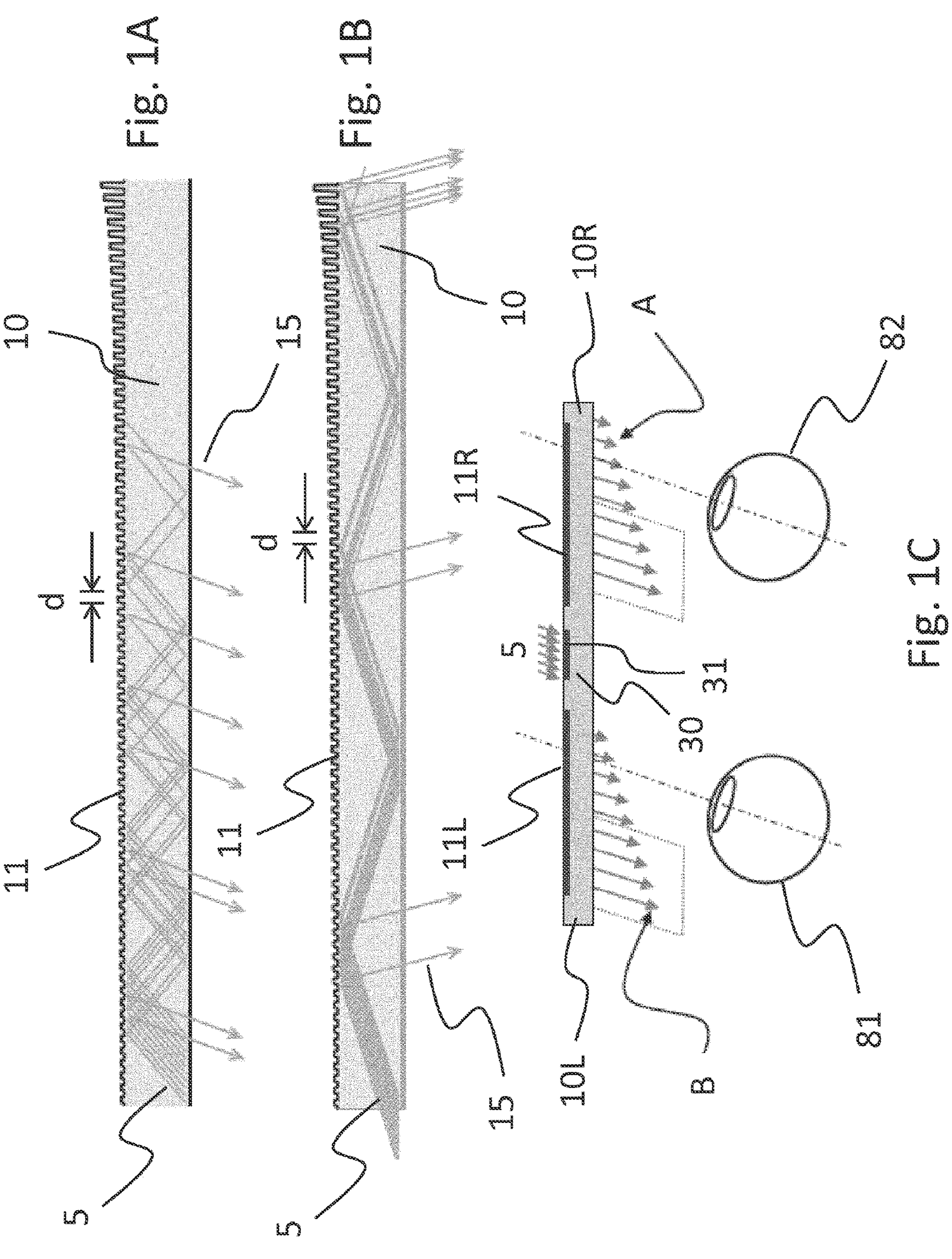
FIG. 1A is a first schematic view showing a longitudinal cross-section through an out-coupling diffractive optical element.
FIG. 1B is a second schematic view showing a longitudinal cross-section through the out-coupling diffractive optical element of FIG. 1A.
FIG. 1C is a schematic view showing a longitudinal cross-section through an apparatus comprising an in-coupling diffractive optical element and a pair of out-coupling diffractive optical elements as seen by a viewer.
Figure 2A:
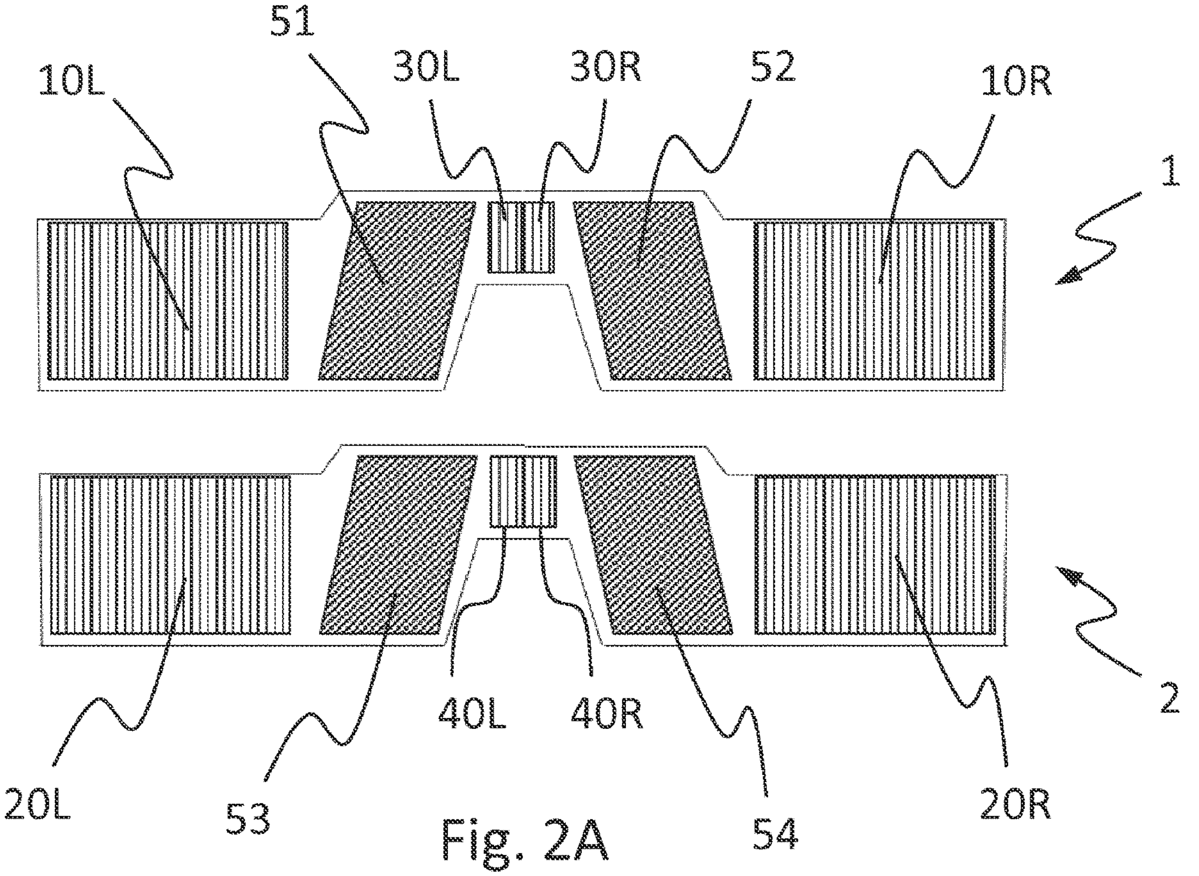
FIG. 2A is a schematic plan view of two components of a first apparatus for out-coupling polychromatic light.
Figure 2B:
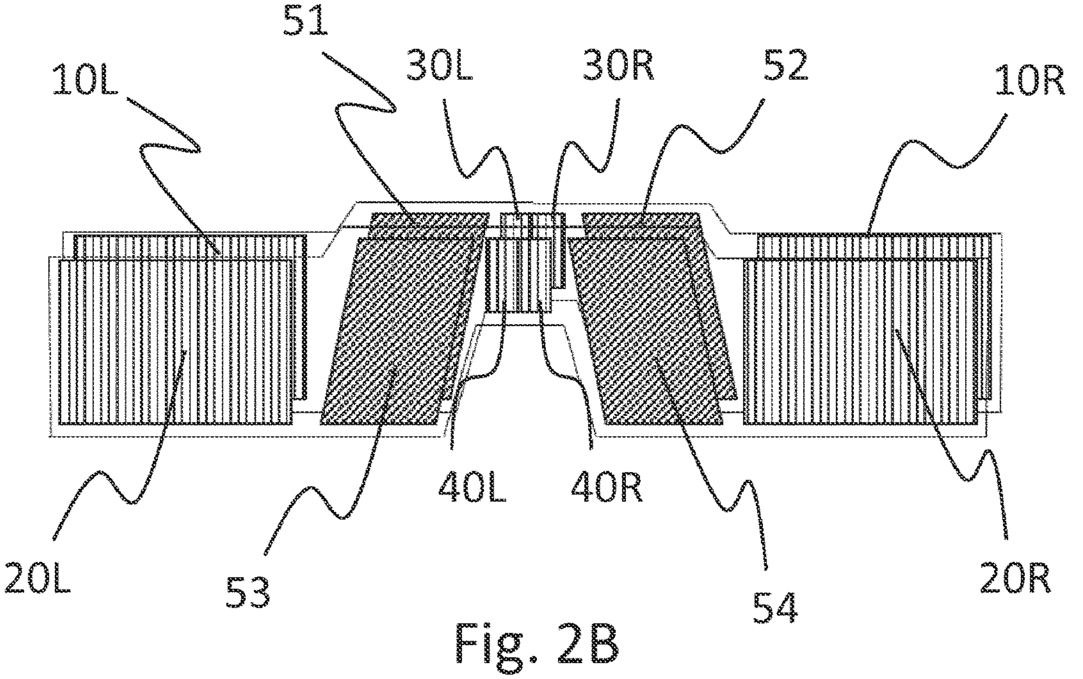
FIG. 2B is a schematic plan view of the two components of FIG. 2A superposed one on top of the other.

If the first pattern of polychromatic light on the left-hand side of the combined field of view is continuous with the second pattern of polychromatic light on the right-hand side of the combined field of view, the first and second patterns of polychromatic light will combine to create a single pattern of polychromatic light in a field of view which is both wider and brighter than in a conventional arrangement, such as that shown and described above in relation to FIGS. 2A and 2B, for example. In order to achieve this, the first and second patterns of polychromatic light do not have to be distinct left and right halves of one image or sequence of images, with a sharp boundary between the two halves. Instead, the first and second patterns of polychromatic light may just be two copies of the same image or sequence of images. If so, the first pattern will fade out from left to right during its passage through the apparatus 3 and the second pattern will fade out from right to left by a similar amount during its passage through the apparatus 3, so that when the two patterns are recombined as just described, they can form a single pattern of uniform brightness, with little or no vignetting.

The apparatus 3 shown in FIG. 3B is suitable for use in a monocular near-eye display, if combined with a first optical projection engine configured to project polychromatic light into the left first and second in-coupling diffractive optical elements 30*a*, 40*b*, and with a second optical projection engine configured to project polychromatic light into the right first and second in-coupling diffractive optical elements 40*a*, 30*b*. Two copies of the apparatus 3 shown in FIG. 3B arranged side by side with each other along their short edges would also be suitable for use in a binocular near-eye display, one for each eye, if combined with at least three optical projection engines, as follows. A first optical projection engine configured to project polychromatic light into the left first and second in-coupling diffractive optical elements 30*a*, 40*b* of a first one of the two apparatuses, a second optical projection engine configured to project polychromatic light into the right first and second in-coupling diffractive optical elements 40*a*, 30*b* of a second one of the two apparatuses, and at least one additional optical projection engine configured to project polychromatic light into the remaining in-coupling diffractive optical elements of the two apparatuses.

Figure 4A:
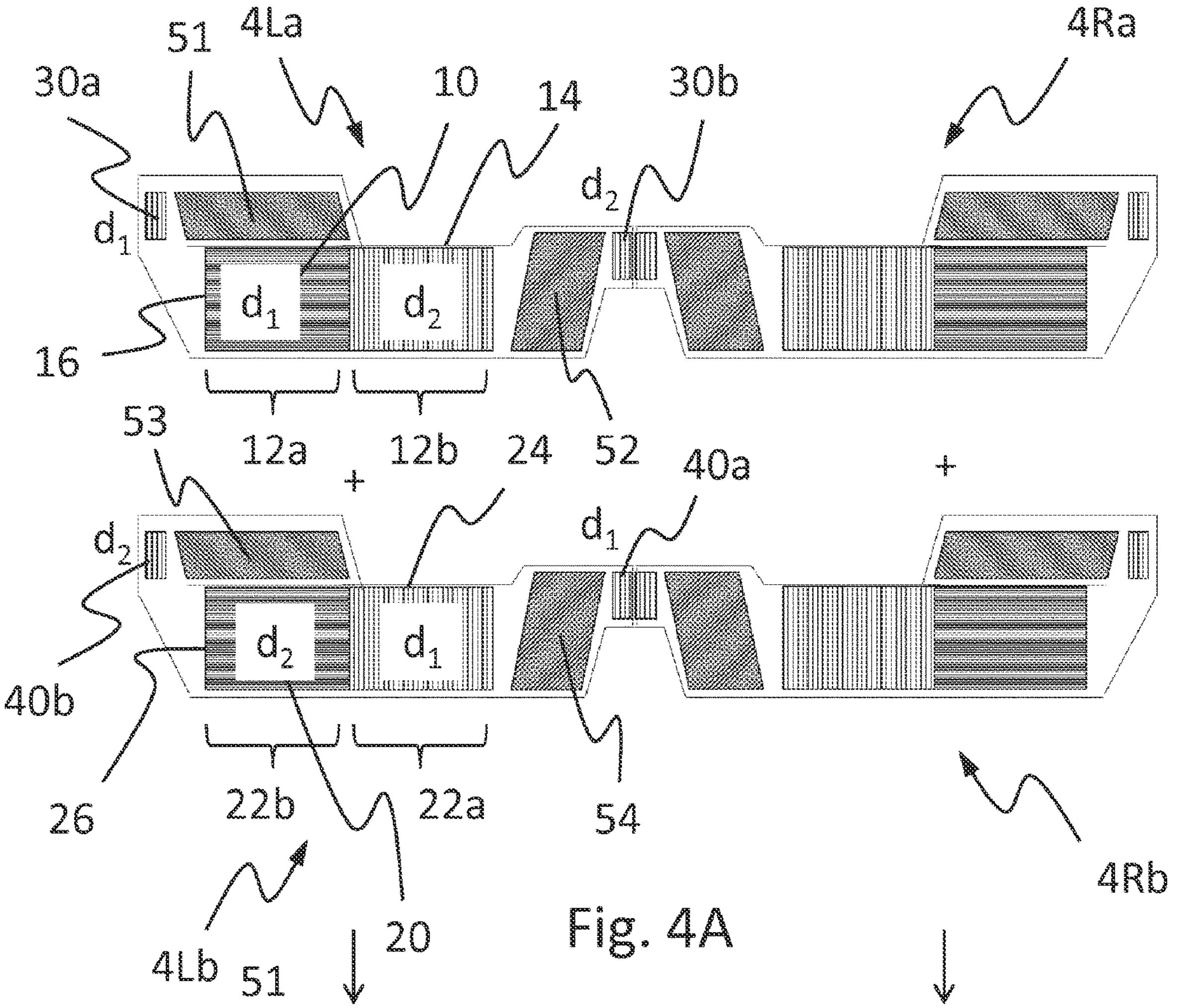
FIG. 4A is a schematic plan view of two components of each of a third and a fourth apparatus for out-coupling polychromatic light.

FIG. 4A shows on the left-hand side thereof, two components 4La, 4Lb of a first apparatus 4L, and on the right-hand side thereof, two components 4Ra, 4Rb of a second apparatus 4R, both of which apparatuses are for out-coupling polychromatic light. The two apparatuses 4L, 4R are mirror images of each other, so for the sake of concision, only the left-hand apparatus 4L will be described below, and the structure and function of the right-hand apparatus 4R can be readily and clearly understood from the same description. The two apparatuses 4L, 4R are suitable for use together with each other in a binocular near-eye display, one for each eye, if combined with suitable optical projection engines, as will be described further below.

The component 4La comprises a first out-coupling diffractive optical element 10, a first in-coupling diffractive optical element 30*a*, a second in-coupling diffractive optical element 30*b*, and two intermediate optical elements 51, 52. The first out-coupling diffractive optical element 10 comprises a first region 12*a* having a first repeated diffraction spacing, $d_1$, and a second region 12*b* adjacent to the first region 12*a* and having a second repeated diffraction spacing, $d_2$, which is different from the first spacing, $d_1$. The first in-coupling diffractive optical element 30*a* also has the first repeated diffraction spacing, $d_1$, and is configured to direct light to the first region 12*a*. The second in-coupling diffractive optical element 30*b* instead has the second repeated diffraction spacing, $d_2$, and is configured to direct light to the second region 12*b*. The two intermediate optical elements 51, 52 are respectively configured to transmit light from the first in-coupling diffractive optical element 30*a* to the first region 12*a* and from the second in-coupling diffractive optical element 30*b* to the second region 12*b*.

The component 4Lb comprises a second out-coupling diffractive optical element 20, another first in-coupling diffractive optical element 40*a*, another second in-coupling diffractive optical element 40*b*, and two further intermediate optical elements 53, 54. The second out-coupling diffractive optical element 20 comprises a first region 22*a* having the first repeated diffraction spacing, $d_1$, and a second region 22*b* adjacent to the first region 22*a* and having the second repeated diffraction spacing, $d_2$. The first in-coupling diffractive optical element 40*a* also has the first repeated diffraction spacing, $d_1$, and is configured to direct light to the first region 22*a*. The second in-coupling diffractive optical element 40*b* instead has the second repeated diffraction spacing, $d_2$, and is configured to direct light to the second region 22*b*. The two intermediate optical elements 53, 54 are respectively configured to transmit light from the first in-coupling diffractive optical element 40*a* to the first region 22*a* and from the second in-coupling diffractive optical element 40*b* to the second region 22*b*.

The first and second out-coupling diffractive optical elements 10, 20 are both substantially rectangular and have respective long edges 14, 24 and short edges 16, 26. A division between the first region 12*a*, 22*a* and the second region 12*b*, 22*b* of the first and second out-coupling diffractive optical elements 10, 20 is located substantially equidistant between the pair of short edges. In this embodiment, the first and second out-coupling diffractive optical elements 10, 20 are both diffraction gratings. The first region 12*a*, 22*a* of each grating comprises rulings of the first spacing, $d_1$, and the second region 12*b*, 22*b* of each grating comprises rulings of the second spacing, $d_2$. In contrast to the embodiment shown and described above in relation to FIGS. 3A and 3B, the rulings of the first region 12*a*, 22*a* of each grating are substantially perpendicular to the rulings of the second region 12*b*, 22*b* of the same grating. In addition, the rulings of the first region 12*a* of the first grating 10 and the rulings of the second region 22*b* of the second grating 20 are aligned substantially perpendicular with the short edges 16, 26 of the out-coupling diffractive optical elements 10, 20. Because of this different configuration of the first region 12*a* of the first grating 10 and of the second region 22*b* of the second grating 20, in contrast to the embodiment shown in FIGS. 3A and 3B, their respective intermediate optical elements 51, 53 are instead positioned along the long edges 14, 24 of the respective ones 10, 20 of the out-coupling diffractive optical elements. On the other hand, the other intermediate optical elements 52, 54 are still positioned along the short edges 16, 26 of the respective ones 10, 20 of the out-coupling diffractive optical elements, as in the embodiment shown in FIGS. 3A and 3B. This different arrangement of the intermediate optical elements 51, 53 allows light to be directed into each grating 10, 20 from directions which are perpendicular to each other, giving greater design freedom to adapt to ergonomic requirements.

Figure 4B:
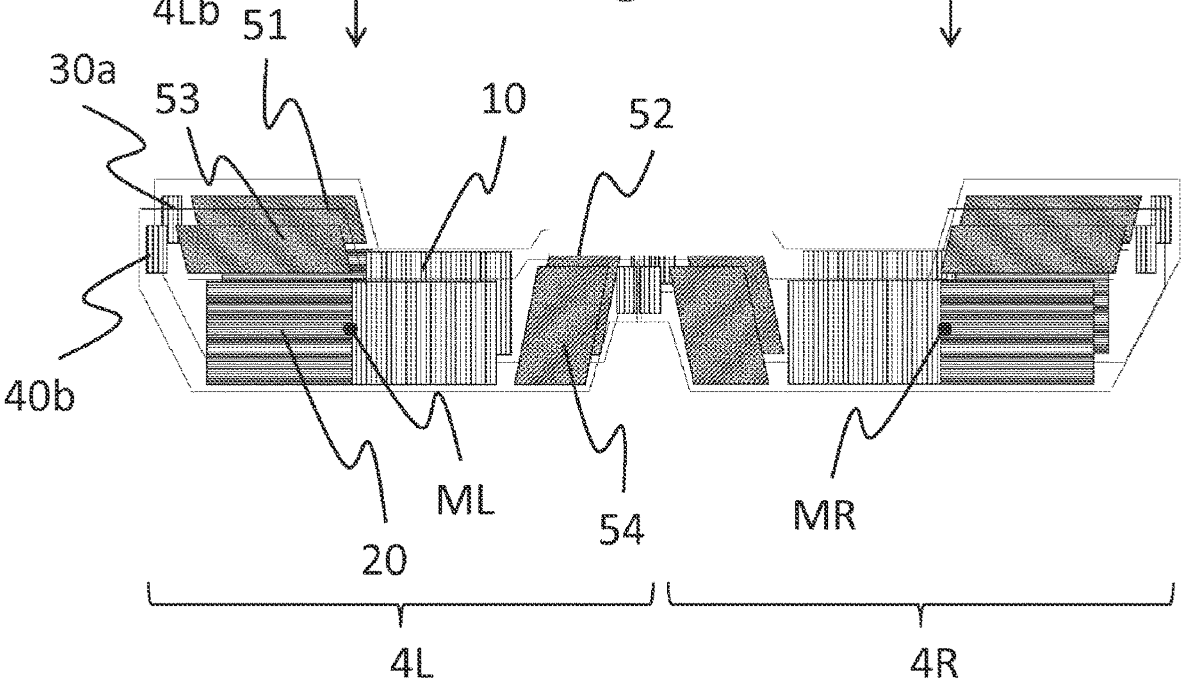
FIG. 4B is a schematic plan view of the two components of each of the third and fourth apparatuses of FIG. 4A superposed one on top of the other.

FIG. 4B shows on the left-hand side thereof, the two components 4La, 4Lb of FIG. 4A superposed one on top of the other in apparatus 4L, and on the right-hand side thereof, the two components 4Ra, 4Rb of FIG. 4A superposed one on top of the other in apparatus 4R. As with FIG. 4A, since the two apparatuses 4L, 4R are mirror images of each other, for the sake of concision, only the left-hand apparatus 4L will be described below, and the structure and function of the right-hand apparatus 4R can be readily and clearly understood from the same description. In the apparatus 4L, the first region 12*a* of the first out-coupling diffractive optical element 10 is carefully aligned with the second region 22*b* of the second out-coupling diffractive optical element 20, and the second region 12*b* of the first out-coupling diffractive optical element 10 is carefully aligned with the first region 22*a* of the second out-coupling diffractive optical element 20. The apparatus 4L is therefore able to function in a similar manner to the apparatus 3 described above in relation to FIG. 3B. Thus, if a first pattern of polychromatic light is projected into the left first and second in-coupling diffractive optical elements 30*a*, 40*b*, and if a second pattern of polychromatic light is projected into the right first and second in-coupling diffractive optical elements 40*a*, 30*b*, the first pattern of polychromatic light will be recreated on a left-hand side of a combined field of view of the out-coupling diffractive optical elements 10, 20 and the second pattern of polychromatic light will be recreated on a right-hand side of the combined field of view of the out-coupling diffractive optical elements 10, 20. If the first pattern of polychromatic light on the left-hand side of the combined field of view is continuous with the second pattern of polychromatic light on the right-hand side of the combined field of view, the first and second patterns of polychromatic light will combine to create a single pattern of light in a field of view which is both wider and brighter than in a conventional arrangement, in a similar manner to that described above in relation to FIG. 3B, with the same technical results and advantages as already described above.

As mentioned above, the two apparatuses 4L, 4R are suitable for use together with each other in a binocular near-eye display, one for each eye, if combined with suitable optical projection engines. If so, these optical projection engines should include a first optical projection engine configured to project polychromatic light into the left first and second in-coupling diffractive optical elements 30*a*, 40*b* of the left-hand one 4L of the two apparatuses, a second optical projection engine configured to project polychromatic light into the right first and second in-coupling diffractive optical elements 30*a*, 40*b* of the right-hand one 4R of the two apparatuses, and at least one additional optical projection engine configured to project polychromatic light into the other in-coupling diffractive optical elements 40*a*, 30*b* of both apparatuses 4L, 4R.

Each of the two apparatuses 4L, 4R has a respective midpoint ML, MR, a shown in FIG. 4B. If the two apparatuses 4L, 4R are combined with optical projection engines in a binocular near-eye display as just described, a separation between these two midpoints ML, MR may also be made adjustable, in order to accommodate different interpupillary distances 83 (see FIG. 7B) of different users.

In a first possible alternative embodiment, the at least one additional optical projection engine may comprise a third optical projection engine configured to project polychromatic light into the first and second in-coupling diffractive optical elements 40*a*, 30*b* of the left-hand apparatus 4L, and a fourth optical projection engine configured to project polychromatic light into the first and second in-coupling diffractive optical elements 40*a*, 30*b* of the right-hand apparatus 4R. However, in a second possible alternative embodiment, the at least one additional optical projection engine may instead be configured to project polychromatic light by temporal or spatial interlacing into the first and second in-coupling diffractive optical elements 40*a*, 30*b* of both of the two apparatuses 4L, 4R. For example, the at least one additional optical projection engine may project alternate frames of a video image sequence into the first and second in-coupling diffractive optical elements 40*a*, 30*b* of both of the two apparatuses 4L, 4R by temporal interlacing, or the at least one additional optical projection engine may project alternate lines of each frame of a video image sequence into the first and second in-coupling diffractive optical elements 40*a*, 30*b* of both of the two apparatuses 4L, 4R by spatial interlacing.

Figures 5A, 5B:
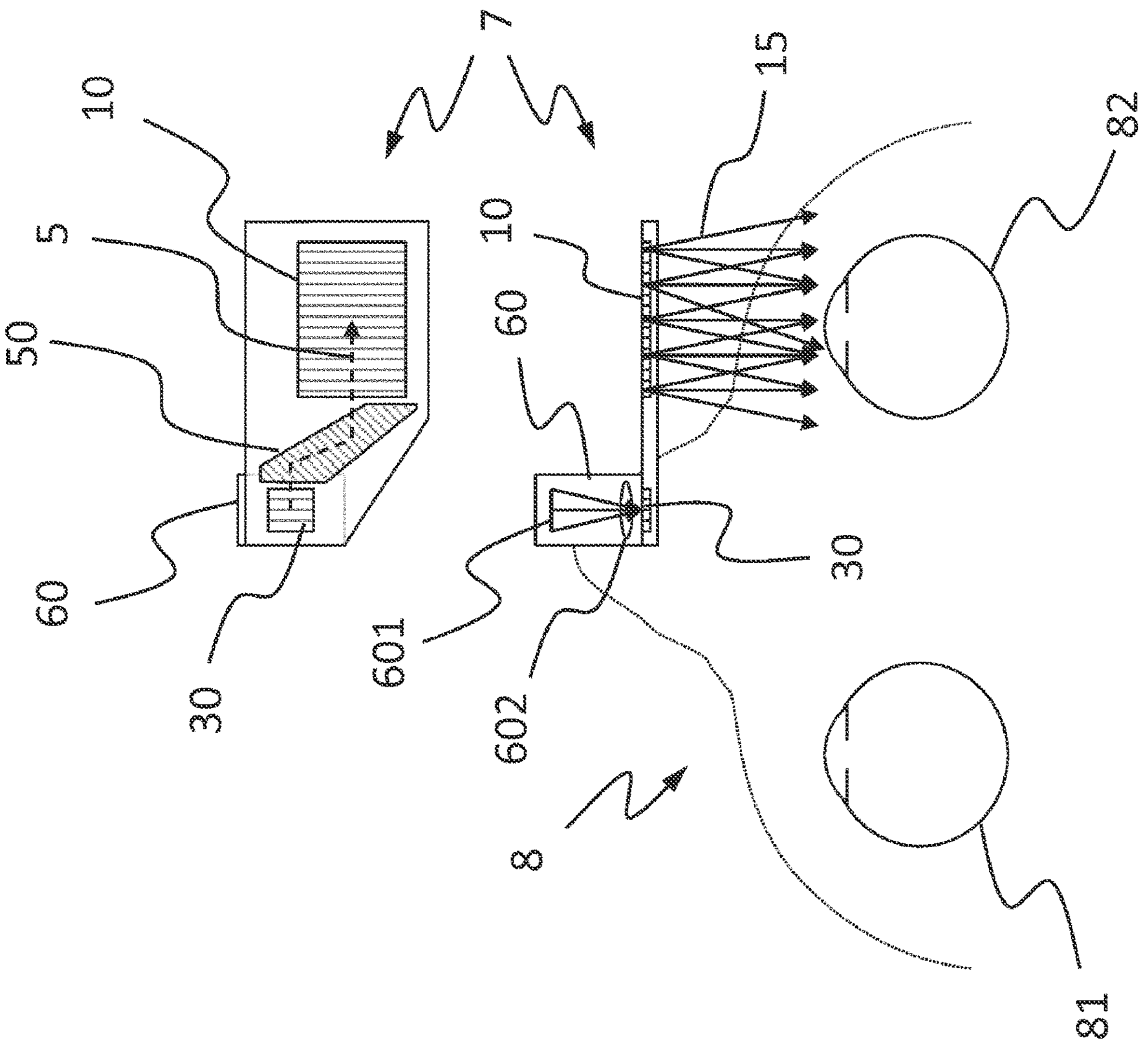
FIG. 5A is a schematic plan view of a first monocular near-eye display.
FIG. 5B is a first schematic view showing a longitudinal cross-section through the monocular near-eye display of FIG. 5A.
Figure 5C:
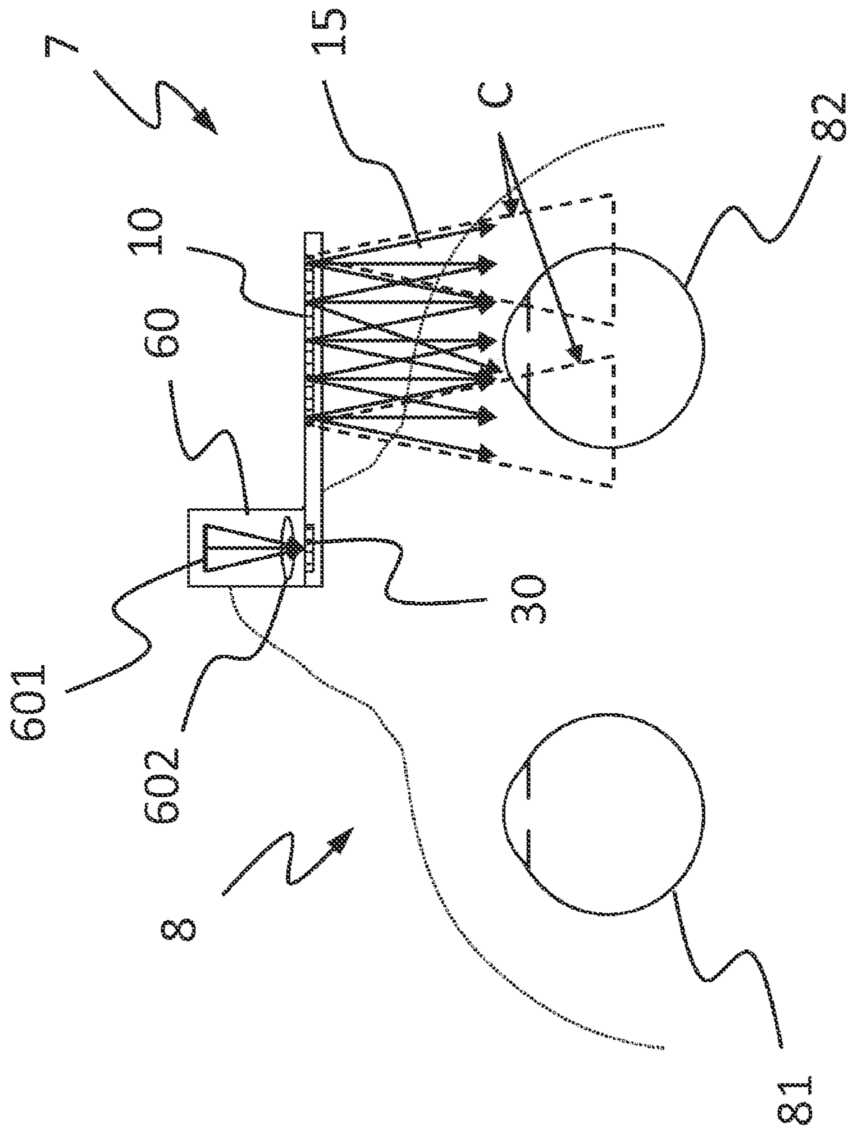
FIG. 5C is a second schematic view showing a longitudinal cross-section through the monocular near-eye display of FIG. 5A.

FIGS. 5A and 5B respectively schematically show plan and cross-sectional views of a first monocular near-eye display 7 in relation to a viewer 8 having eyeballs 81, 82. The monocular near-eye display 7 comprises an optical projection engine 60, an in-coupling diffractive optical element 30, an intermediate optical element 50, and an out-coupling diffractive optical element 10. The optical projection engine 60 comprises a microdisplay 601 and a collimator 602. The out-coupling diffractive optical element 10 comprises a diffractive layer having a repeated diffraction spacing, d. Light 5 from the microdisplay 601 is projected by the collimator 602 into the in-coupling diffractive optical element 30 and is transmitted from there by the intermediate optical element 50 to the out-coupling diffractive optical element 10. The light 5 is transmitted through the interior of the diffractive optical element 10 by total internal reflection and is diffracted by the diffractive layer thereof. When diffracted, the light 5 is out-coupled from the diffractive optical element 10, as represented by arrows 15. Since the out-coupling diffractive optical element 10 is of a conventional design, similar to that shown and described above in relation to FIGS. 2A and 2B, some of the out-coupled light 15 is wasted by falling in regions indicated in FIG. 5C by the letter C, outside the entrance pupil of eye 82.

Figures 6A, 6B:
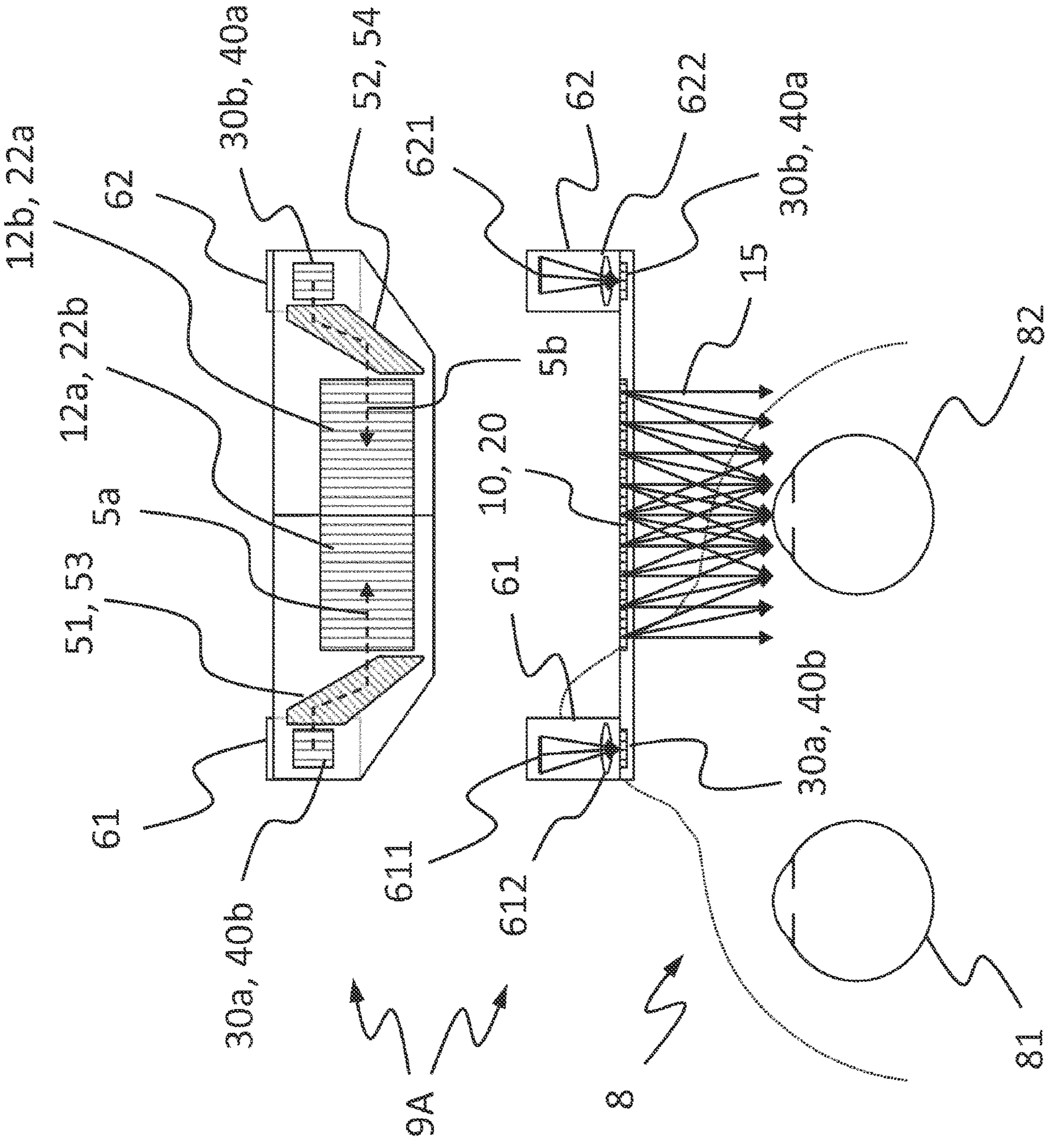
FIG. 6A is a schematic plan view of a second monocular near-eye display in a first configuration.
FIG. 6B is a schematic view showing a longitudinal cross-section through the monocular near-eye display of FIG. 6A in the first configuration.

In contrast, FIGS. 6A and 6B respectively schematically show plan and cross-sectional views of a second monocular near-eye display 9A in relation to a viewer 8 having eyeballs 81, 82. The monocular near-eye display 9A comprises two optical projection engines 61, 62, each of which respectively comprises a microdisplay 611, 621 and a collimator 612, 622. The monocular near-eye display 9A further comprises an apparatus 3, as described above in relation to FIG. 3B. The apparatus 3 therefore comprises two pairs of superposed and aligned in-coupling diffractive optical elements 30*a*, 40*b* and 30*b*, 40*a*, four intermediate optical elements 51, 52, 53, 54, and two superposed and aligned out-coupling diffractive optical elements 10, 20. The out-coupling diffractive optical elements 10, 20 each respectively comprise a first region 12*a*, 22*a* and a second region 12*b*, 22*b*, with properties as already described above in relation to FIG. 3B. Thus a first pattern of polychromatic light 5*a* projected by a first one 61 of the two optical projection engines into the in-coupling diffractive optical elements 30*a*, 40*b* and a second pattern of polychromatic light 5*b* projected by a second one 62 of the two optical projection engines into the in-coupling diffractive optical elements 30*b*, 40*a* are combined with each other by the two superposed and aligned out-coupling diffractive optical elements 10, 20 to create a single pattern of polychromatic light 15 in a field of view which is both wider and brighter than in a conventional arrangement, such as that shown and described above in relation to FIGS. 5A to 5C. When the two patterns 5*a*, 5*b* are thus recombined, they can therefore form a single pattern of uniform brightness, with little or no vignetting.

Figures 7A, 7B:
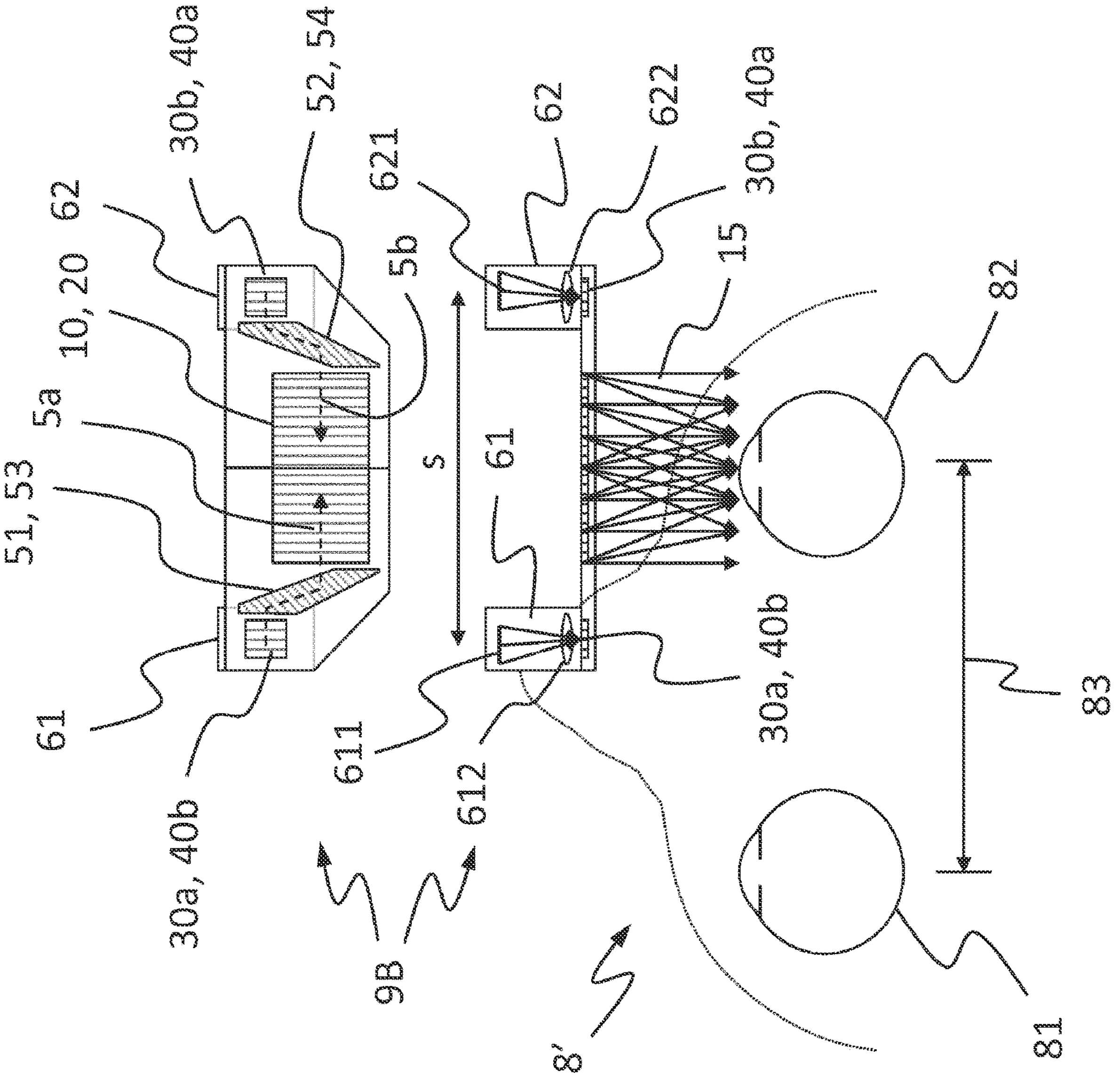
FIG. 7A is a schematic plan view of the second monocular near-eye display of FIGS. 6A and 6B in a second configuration.
FIG. 7B is a schematic view showing a longitudinal cross-section through the monocular near-eye display of FIGS. 6A to 7A in the second configuration.

FIGS. 7A and 7B respectively schematically show plan and cross-sectional views of a third monocular near-eye display 9B, wherein the length of the long edges of the first and second out-coupling diffractive optical elements 10, 20 is less than that of the long edges of the first and second out-coupling diffractive optical elements 10, 20 in the second monocular near-eye display 9A, whereas a length of the short edges of the first and second out-coupling diffractive optical elements 10, 20 remains the same. In other words, an aspect ratio of the first and second out-coupling diffractive optical elements 10, 20 in the third monocular near-eye display 9B is less than that of the first and second out-coupling diffractive optical elements 10, 20 in the second monocular near-eye display 9A. A separation, s, of the two optical projection engines 61, 62 has also been correspondingly reduced, in comparison to their respective dispositions as shown in FIGS. 6A and 6B. On the other hand, the division between the first and second regions of the first and second out-coupling diffractive optical elements 10, 20 has been maintained substantially equidistant between the short edges of elements 10, 20. Thus, as may be seen in FIG. 7B, the eye of a viewer 8' of the first and second out-coupling diffractive optical elements 10, 20 remains positioned substantially perpendicular to this division, for equal viewing of the first and second regions. On the other hand, as may be seen by comparing the spread of the arrows 15 representing out-coupled light in FIG. 7B with that of the arrows 15 in FIG. 6B, more of the out-coupled light enters the eye 82 of the viewer 8' in FIG. 7B than enters the eye of the viewer 8 in FIG. 6B, and less of the out-coupled light is wasted. The viewer 8' therefore experiences an image of improved brightness.

In all of the accompanying drawings, including FIGS. 5A, 6A and 7A, it should be noted that the orientation of the hatching on the intermediate optical elements 50, 51, 52, 53, 54 does not necessarily represent the orientation of any repeated diffractive features of the intermediate optical elements 50, 51, 52, 53, 54.

Figure 8:
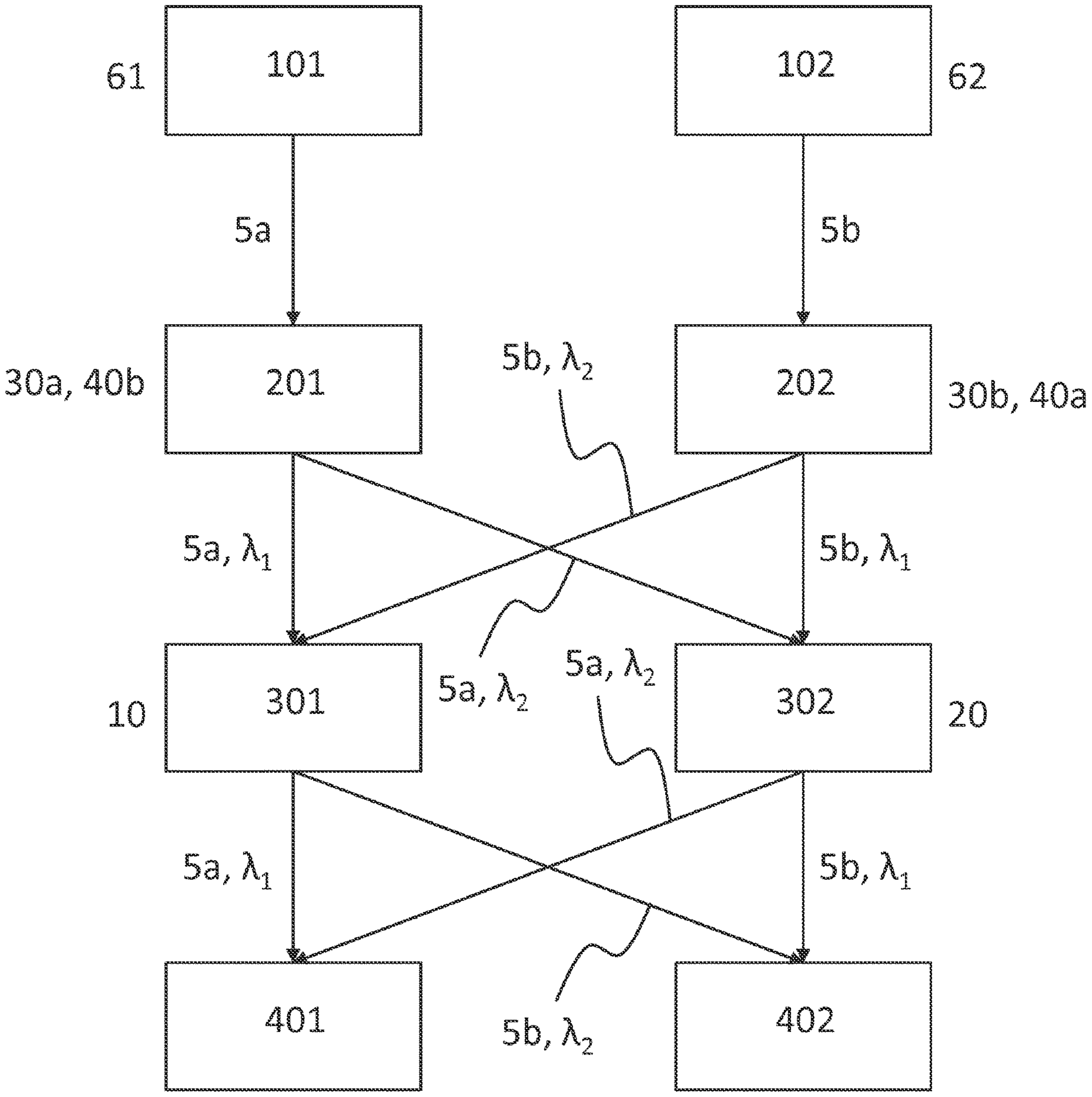
FIG. 8 is a flow diagram schematically representing a method of out-coupling polychromatic light.

Finally, FIG. 8 schematically represents a method of out-coupling polychromatic light. In box 101, polychromatic light with a first pattern 5*a* is projected into one 30*a* of a first pair of in-coupling diffractive optical elements with a first repeated diffraction spacing corresponding to a first wavelength and into one 40*b* of a second pair of in-coupling diffractive optical elements with a second repeated diffraction spacing corresponding to a second wavelength. Meanwhile, in box 102, polychromatic light with a second pattern 5*b* is projected into the other 40*a* of the first pair of in-coupling diffractive optical elements with the first repeated diffraction spacing and into the other 30*b* of the second pair of in-coupling diffractive optical elements with the second repeated diffraction spacing.

In box 201, the first pattern of light 5*a* is transmitted from said one 30*a* of the first pair of in-coupling diffractive optical elements to the first region 12*a* of the first out-coupling diffractive optical element and from said one 40*b* of the second pair of in-coupling diffractive optical elements to the second region 22*b* of the second out-coupling diffractive optical element 20. Meanwhile, in box 202, the second pattern of light is transmitted from said other 40*a* of the first pair of in-coupling diffractive optical elements to the first region 22*a* of the second out-coupling diffractive optical element 20 and from said other 30*b* of the second pair of in-coupling diffractive optical elements to the second region 12*b* of the first out-coupling diffractive optical element 10.

In box 301, the first pattern of light 5*a* of the first wavelength $\lambda_1$ is emitted from the first region 12*a* of the first out-coupling diffractive optical element 10 and the second pattern of light 5*b* of the second wavelength $\lambda_2$ is emitted from the second region 12*b* of the first out-coupling diffractive optical element 10 adjacent to the first region 12*a*. Meanwhile, in box 302, light of the first wavelength in the second pattern 5*b* is emitted from the first region 22*a* of the second out-coupling diffractive optical element 20 and light of the second wavelength $\lambda_2$ in the first pattern is emitted from a second region 22*b* of the second out-coupling diffractive optical element 20 adjacent to the first region.

In box 401, the first patterns of light emitted from the first region 12*a* of the first out-coupling diffractive optical element 10 and from the second region 22*b* of the second out-coupling diffractive optical element 20 are superposed and aligned with each other. Meanwhile, in box 402, the second patterns of light emitted from the second region 12*b* of the first out-coupling diffractive optical element 10 and from the first region 22*a* of the second out-coupling diffractive optical element 20 are also superposed and aligned with each other. If the first and second patterns of light are spatially continuous with each other, they can combine to form a single pattern, such as a single still image or a single frame of a video sequence, in a field of view which is both wider and brighter than if just one of the first and second patterns were present. Whereas boxes 301, 302, 401 and 402 are essential features of this method, boxes 101, 102, 201 and 202 are only preferred features.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to 'comprising only one' or by using 'consisting'.

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An apparatus comprising:
at least one in-coupling diffractive element;
at least one intermediate optical element configured to transmit light from the at least one in-coupling diffractive optical element;
a first out-coupling diffractive optical element wherein the first out-coupling diffractive optical element is configured to receive and outcouple light from the at least one intermediate optical element, wherein the first out-coupling diffractive optical element comprises:
a first region having a first repeated diffraction spacing, $d_1$, positioned to diffract a first light beam, and
a second region adjacent to the first region having a second repeated diffraction spacing, $d_2$, different from the first spacing, $d_1$, positioned to diffract the first light beam.

2. An apparatus according to claim 1, further comprising:
a second out-coupling diffractive optical element superposed on the first out-coupling diffractive optical element, wherein the first region of the first out-coupling diffractive optical element is superposed on and aligned with a second region of the second out-coupling diffractive optical element; and
the second region of the first out-coupling diffractive optical element is superposed on and aligned with a first region of the second out-coupling diffractive optical element.

3. An apparatus according to claim 2, wherein the second out-coupling diffractive optical elements comprises:
the first region having a first repeated diffraction spacing, $d_1$, positioned to diffract a second light beam, and
the second region adjacent to the first region having a second repeated diffraction spacing, $d_2$, different from the first spacing, $d_1$, positioned to diffract the second light beam.

4. An apparatus according to claim 2, wherein the first and second out-coupling diffractive optical elements are both substantially rectangular and have a pair of long edges and a pair of short edges, and a division between the first region and the second region of the first and second out-coupling diffractive optical elements is located substantially equidistant between the pair of short edges.

5. An apparatus according to claim 2, wherein the first and second out-coupling diffractive optical elements are both diffraction gratings, wherein the first region of each grating comprises rulings of the first spacing, $d_1$, the second region of each grating comprises rulings of the second spacing, $d_2$, and the rulings of the first region of each grating are substantially parallel to the rulings of the second region of the same grating.

6. An apparatus according to claim 2, wherein the first and second out-coupling diffractive optical elements are both diffraction gratings, wherein the first region of each grating comprises rulings of the first spacing, $d_1$, the second region of each grating comprises rulings of the second spacing, $d_2$, and the rulings of the first region of each grating are substantially perpendicular to the rulings of the second region of the same grating.

7. An apparatus according to claim 2, further comprising:

a first pair of in-coupling diffractive optical element having the first repeated diffraction spacing, $d_1$, and configured to direct light to the first region of respective ones of the first and second out-coupling diffractive optical elements; and a second pair of in-coupling diffractive optical element having the second repeated diffraction spacing, $d_2$, and configured to direct light to the second region of respective ones of the first and second out-coupling diffractive optical elements.

8. An apparatus according to claim 7, further comprising at least one intermediate optical element configured to transmit light from a respective one of the in-coupling diffractive optical elements to a region of a respective one of the out-coupling diffractive optical elements having the same spacing as the respective one of the in-coupling diffractive optical elements.

9. An apparatus according to claim 8, further comprising:

at least one intermediate optical element configured to transmit light from a respective one of the in-coupling diffractive optical elements to a region of a respective one of the out-coupling diffractive optical elements having the same spacing as the respective one of the in-coupling diffractive optical elements, wherein the first and second out-coupling diffractive optical elements are both substantially rectangular and have a pair of long edges and a pair of short edges, and a division between the first region and the second region of the first and second out-coupling diffractive optical elements is located substantially equidistant between the pair of short edges, wherein the first and second out-coupling diffractive optical elements are both diffraction gratings, wherein the first region of each grating comprises rulings of the first spacing, d1, the second region of each grating comprises rulings of the second spacing, d2, and the rulings of the first region of each grating are substantially parallel to the rulings of the second region of the same grating, wherein the intermediate optical element is positioned along one of the short edges of the respective one of the out-coupling diffractive optical elements.

10. An apparatus according to claim 8, further comprising:

at least one intermediate optical element configured to transmit light from a respective one of the in-coupling diffractive optical elements to a region of a respective one of the out-coupling diffractive optical elements having the same spacing as the respective one of the in-coupling diffractive optical elements, wherein the first and second out-coupling diffractive optical elements are both substantially rectangular and have a pair of long edges and a pair of short edges, and a division between the first region and the second region of the first and second out-coupling diffractive optical elements is located substantially equidistant between the pair of short edges, wherein the first and second out-coupling diffractive optical elements are both diffraction gratings, wherein the first region of each grating comprises rulings of the first spacing, d1, the second region of each grating comprises rulings of the second spacing, d2, and the rulings of the first region of each grating are substantially parallel to the rulings of the second region of the same grating, wherein the intermediate optical element is positioned along one of the long edges of the respective one of the out-coupling diffractive optical elements.

11. A monocular near-eye display comprising:

an apparatus according to claim 7;

a first optical projection engine configured to project polychromatic light into the first and second in-coupling diffractive optical elements which are respectively configured to direct light to the first region of the first out-coupling diffractive optical element and to the second region of the second out-coupling diffractive optical element; and a second optical projection engine configured to project polychromatic light into the first and second in-coupling diffractive optical elements which are respectively configured to direct light to the first region of the second out-coupling diffractive optical element and to the second region of the first out-coupling diffractive optical element.

12. A binocular near-eye display comprising:

two apparatuses according to claim 7;

a first optical projection engine configured to project polychromatic light into the first and second in-coupling diffractive optical elements which are respectively configured to direct light to the first region of the first out-coupling diffractive optical element and to the second region of the second out-coupling diffractive optical element of a first one of the two apparatuses;

a second optical projection engine configured to project polychromatic light into the first and second in-coupling diffractive optical elements which are respectively configured to direct light to the first region of the first out-coupling diffractive optical element and to the second region of the second out-coupling diffractive optical element of a second one of the two apparatuses; and at least one additional optical projection engine configured to project polychromatic light into the first and second in-coupling diffractive optical elements which are respectively configured to direct light to the first region of the second out-coupling diffractive optical element and to the second region of the first out-coupling diffractive optical element of at least one of the two apparatuses.

13. A binocular near-eye display according to claim 12, wherein each of the two apparatuses has a respective midpoint, and a separation between the midpoints of the two apparatuses is adjustable, to accommodate different inter-pupillary distances of different users.

14. A binocular near-eye display according to claim 10, wherein the at least one additional optical projection engine comprises:

a third optical projection engine configured to project polychromatic light into the first and second in-coupling diffractive optical elements which are respectively configured to direct light to the first region of the second out-coupling diffractive optical element and to the second region of the first out-coupling diffractive optical element of the first one of the two apparatuses; and a fourth optical projection engine configured to project polychromatic light into the first and second in-coupling diffractive optical elements which are respectively configured to direct light to the first region of the second out-coupling diffractive optical element and to the second region of the first out-coupling diffractive optical element of the second one of the two apparatuses.

15. A binocular near-eye display according to claim 13, wherein the at least one additional optical projection engine is configured to project polychromatic light by temporal or spatial interlacing into the first and second in-coupling diffractive optical elements which are respectively configured to direct light to the first region of the second out-coupling diffractive optical element and to the second region of the first out-coupling diffractive optical element of both of the two apparatuses.

16. A method comprising:

transmitting light through at least one in-coupling diffractive element, the light having a first pattern;

transmitting the light from the at least one in-coupling diffractive optical element through at least one intermediate optical element; and emitting and outcoupling the first pattern of light from a first out-coupling diffractive optical element, wherein the first out-coupling diffractive optical element comprises:

a first region having a first repeated diffraction spacing, $d_1$, positioned to diffract a first light beam, and a second region adjacent to the first region having a second repeated diffraction spacing, $d_2$, different from the first spacing, $d_1$, positioned to diffract the first light beam.

17. A method according to claim 16, wherein the light having the first pattern has a first wavelength and the light having the second pattern has a second wavelength.

18. A method according to claim 17, further comprising:

emitting first pattern of light of the first wavelength from a first region of the first out-coupling diffractive optical element and the second pattern of light of the second wavelength from a second region of the first out-coupling diffractive optical element adjacent to the first region;

emitting light of the first wavelength in the second pattern from a first region of a second out-coupling diffractive optical element and light of the second wavelength in the first pattern from a second region of the second out-coupling diffractive optical element adjacent to the first region;

superposing and aligning the first patterns of light emitted from the first region of the first out-coupling diffractive optical element and from the second region of the second out-coupling diffractive optical element; and superposing and aligning the second patterns of light emitted from the second region of the first out-coupling diffractive optical element and from the first region of the second out-coupling diffractive optical element.

19. A method according to claim 18, further comprising:

projecting polychromatic light with the first pattern into one of a first pair of in-coupling diffractive optical elements with a first repeated diffraction spacing corresponding to the first wavelength and into one of a second pair of in-coupling diffractive optical elements with a second repeated diffraction spacing corresponding to the second wavelength;

projecting polychromatic light with the second pattern into the other of the first pair of in-coupling diffractive optical elements with the first repeated diffraction spacing and into the other of the second pair of in-coupling diffractive optical elements with the second repeated diffraction spacing;

transmitting the first pattern of light from said one of the first pair of in-coupling diffractive optical elements to the first region of the first out-coupling diffractive optical element and from said one of the second pair of in-coupling diffractive optical elements to the second region of the second out-coupling diffractive optical element; and transmitting the second pattern of light from said other of the first pair of in-coupling diffractive optical elements to the first region of the second out-coupling diffractive optical element and from said other of the second pair of in-coupling diffractive optical elements to the second region of the first out-coupling diffractive optical element.

* * * * *